(12) United States Patent
Fujisaki

(10) Patent No.: US 9,398,225 B2
(45) Date of Patent: Jul. 19, 2016

(54) ZOOM LENS AND IMAGE PICKUP APPARATUS HAVING THE SAME

(71) Applicant: CANON KABUSHIKI KAISHA, Tokyo (JP)

(72) Inventor: Toyokatsu Fujisaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 14/543,563

(22) Filed: Nov. 17, 2014

(65) Prior Publication Data

US 2015/0138401 A1 May 21, 2015

(30) Foreign Application Priority Data

Nov. 21, 2013 (JP) .................................. 2013-240991

(51) Int. Cl.
  *G02B 15/14* (2006.01)
  *H04N 5/232* (2006.01)
  *G02B 15/173* (2006.01)
  *G02B 15/22* (2006.01)

(52) U.S. Cl.
  CPC ............ *H04N 5/23296* (2013.01); *G02B 15/14* (2013.01); *G02B 15/173* (2013.01); *G02B 15/22* (2013.01)

(58) Field of Classification Search
  CPC ...... G02B 15/173; G02B 15/22; G02B 15/14; G02B 13/009; H04N 5/23296
  See application file for complete search history.

(56) References Cited

U.S. PATENT DOCUMENTS 9,069,156 B2 * 6/2015 Ito ........................ G02B 15/14

FOREIGN PATENT DOCUMENTS

JP 2012-220920 A 11/2012

* cited by examiner

*Primary Examiner* — David N Spector
(74) *Attorney, Agent, or Firm* — Canon U.S.A. Inc., IP Division

(57) ABSTRACT

A zoom lens including: a first lens unit having a positive refractive power, a second lens unit having a negative refractive power, a third lens unit having a positive refractive power, a fourth lens unit having a negative refractive power, and a fifth lens unit having a positive refractive power in this order from an object side to an image side. During zooming, the lens units move such that an interval between adjacent lens units varies. The third lens unit includes at least two positive lenses. A partial dispersion ratio ($\theta gF3P$) of a material and the Abbe number ($vd3P$) of a positive lens included in the third lens unit satisfy the following conditional expressions, $$\theta gF3P-(-1.665\times 10^{-7}\cdot vd3P^3+5.213\times 10^{-5}\cdot vd3P^2-5.656\times 10^{-3}\cdot vd3P+0.737)>0$$

$$50.0<vd3P<100.0.$$

10 Claims, 22 Drawing Sheets

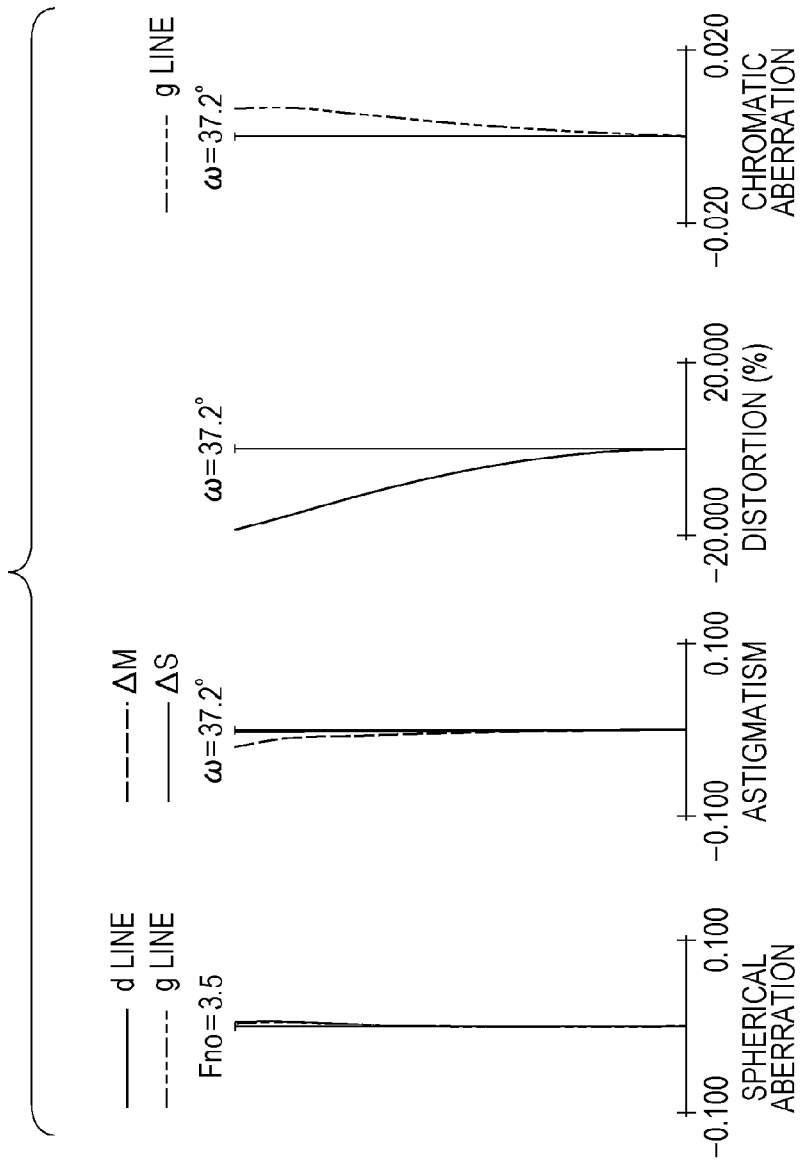

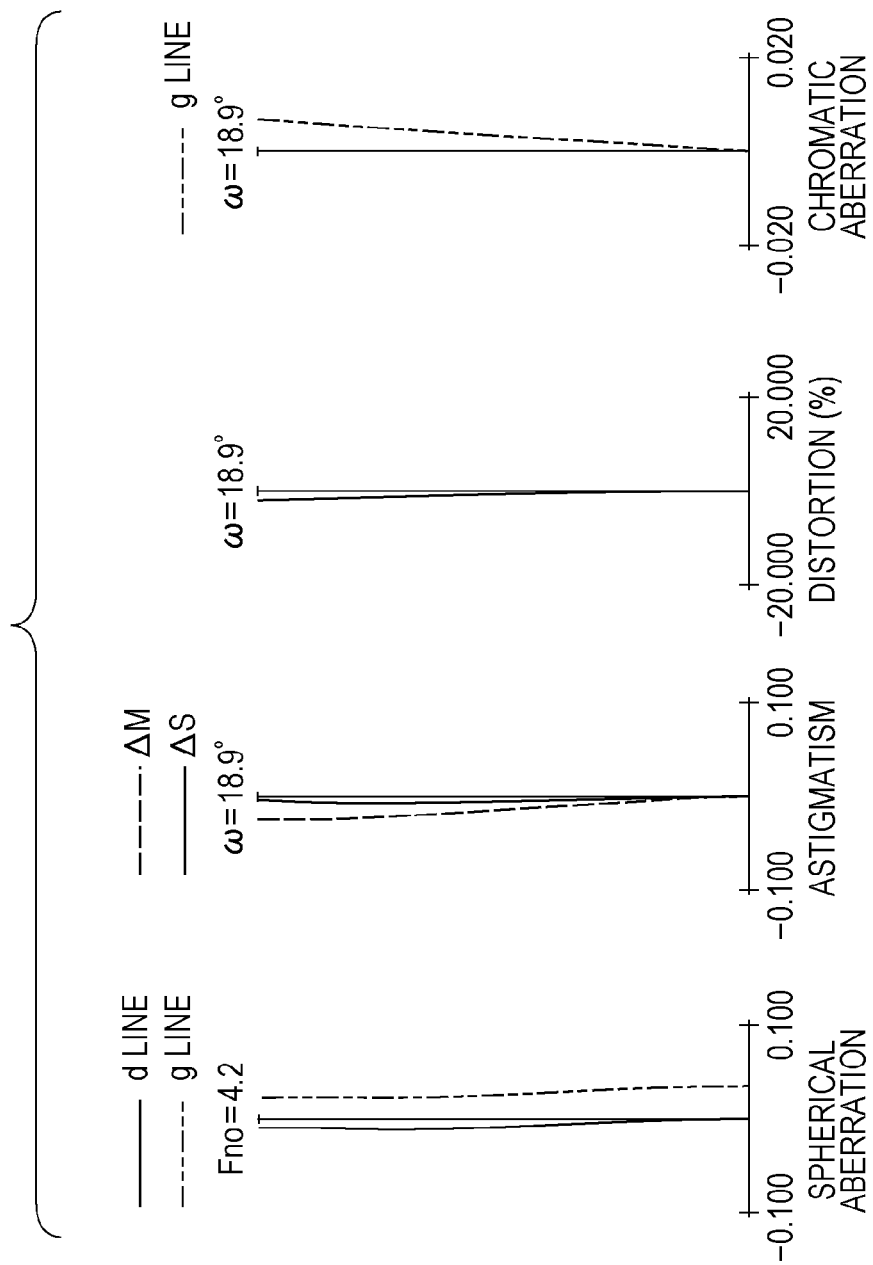

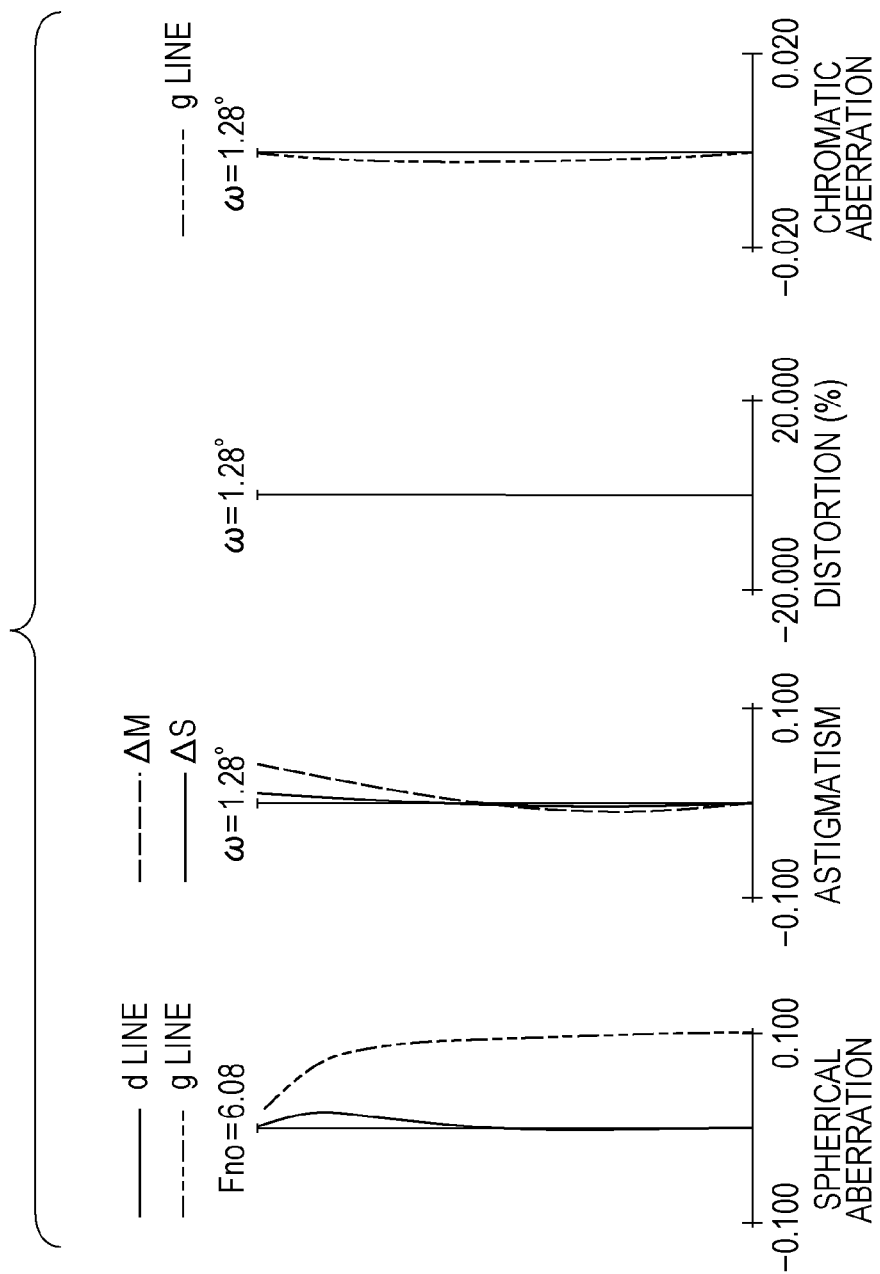

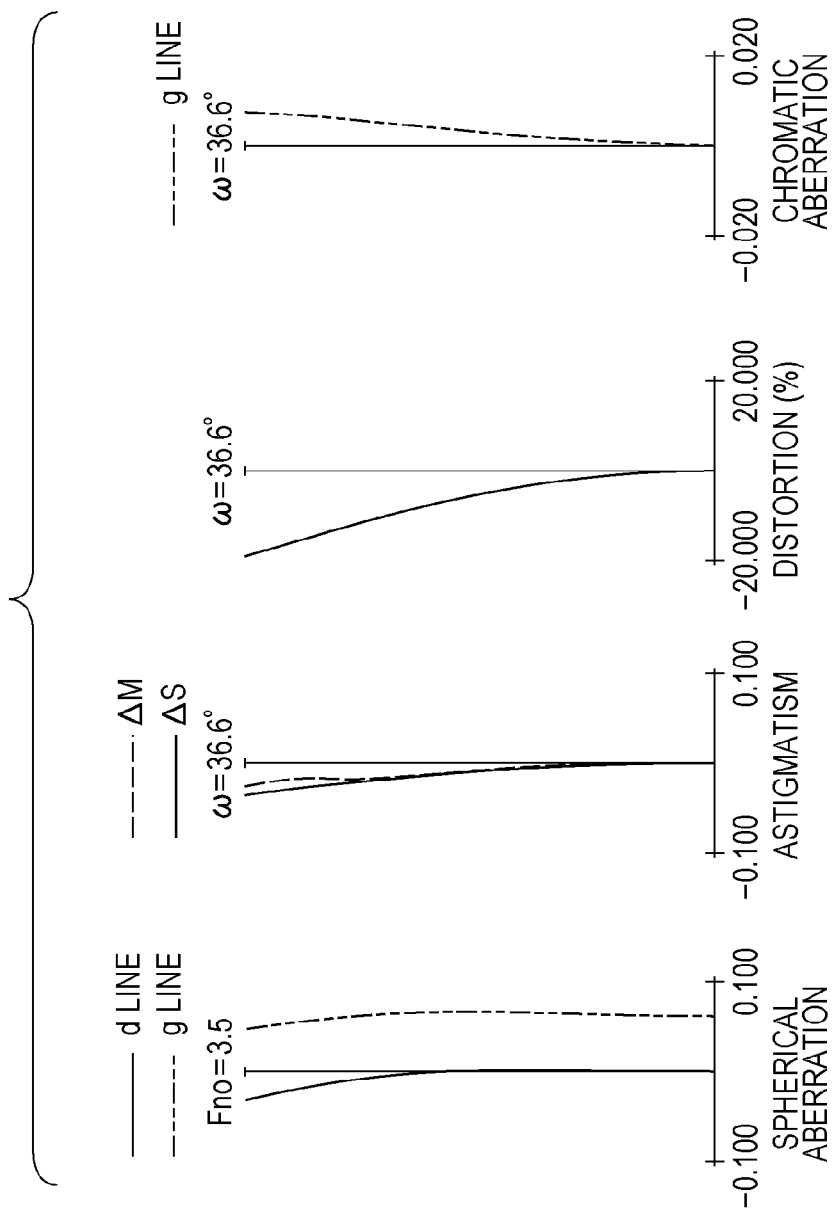

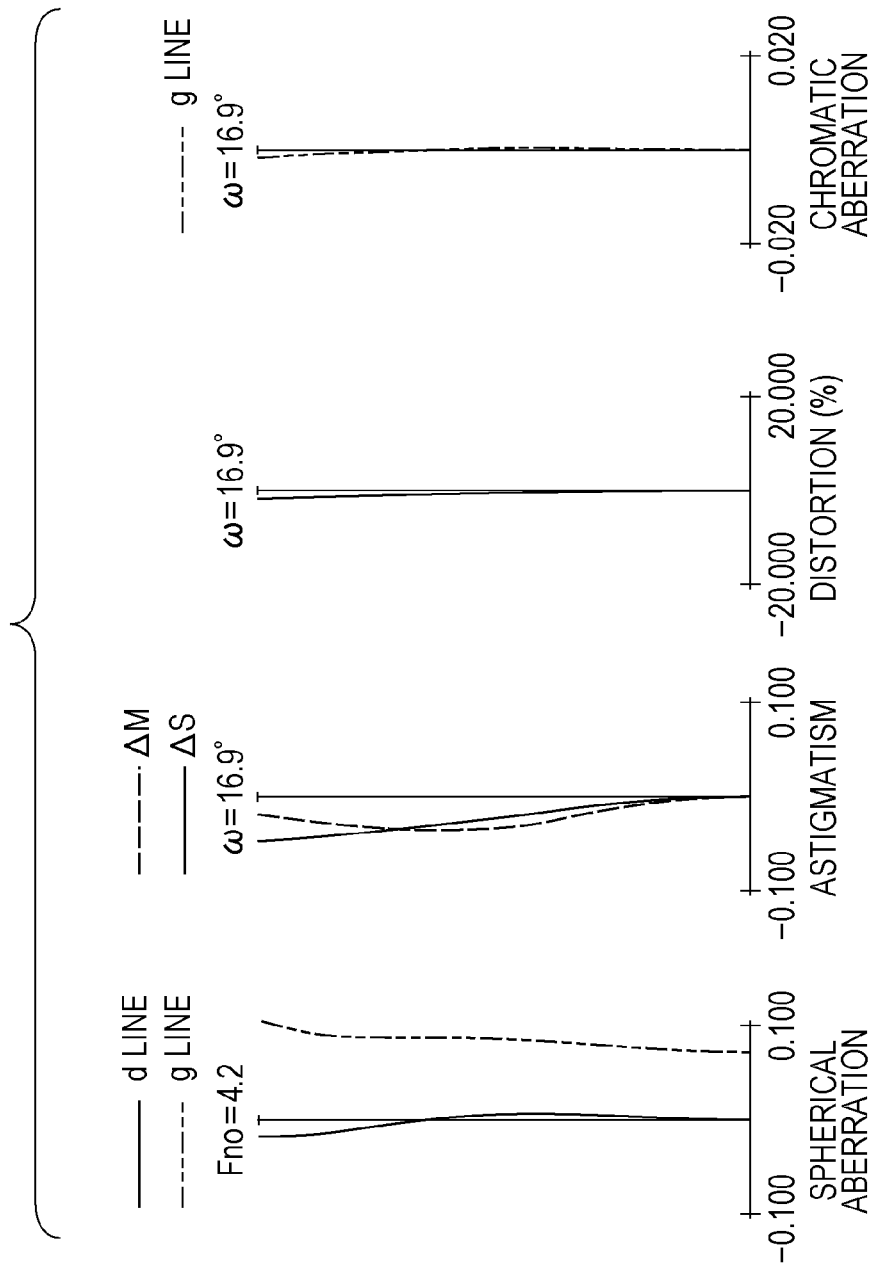

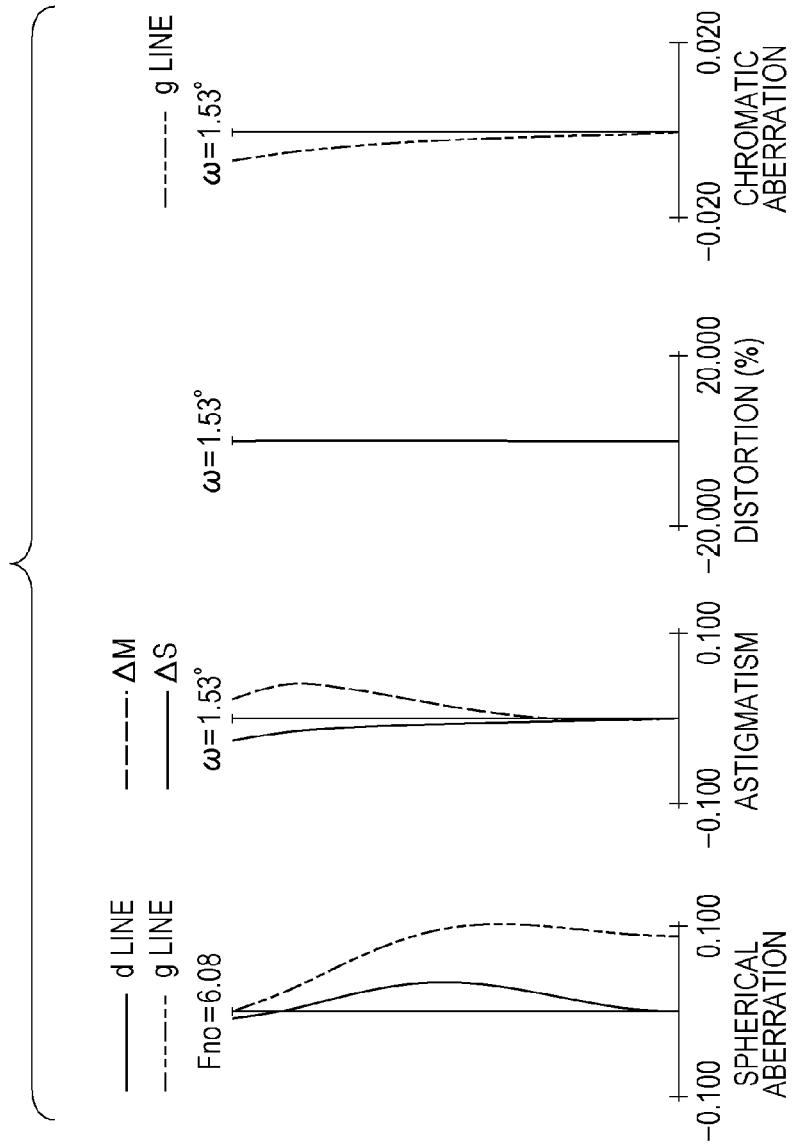

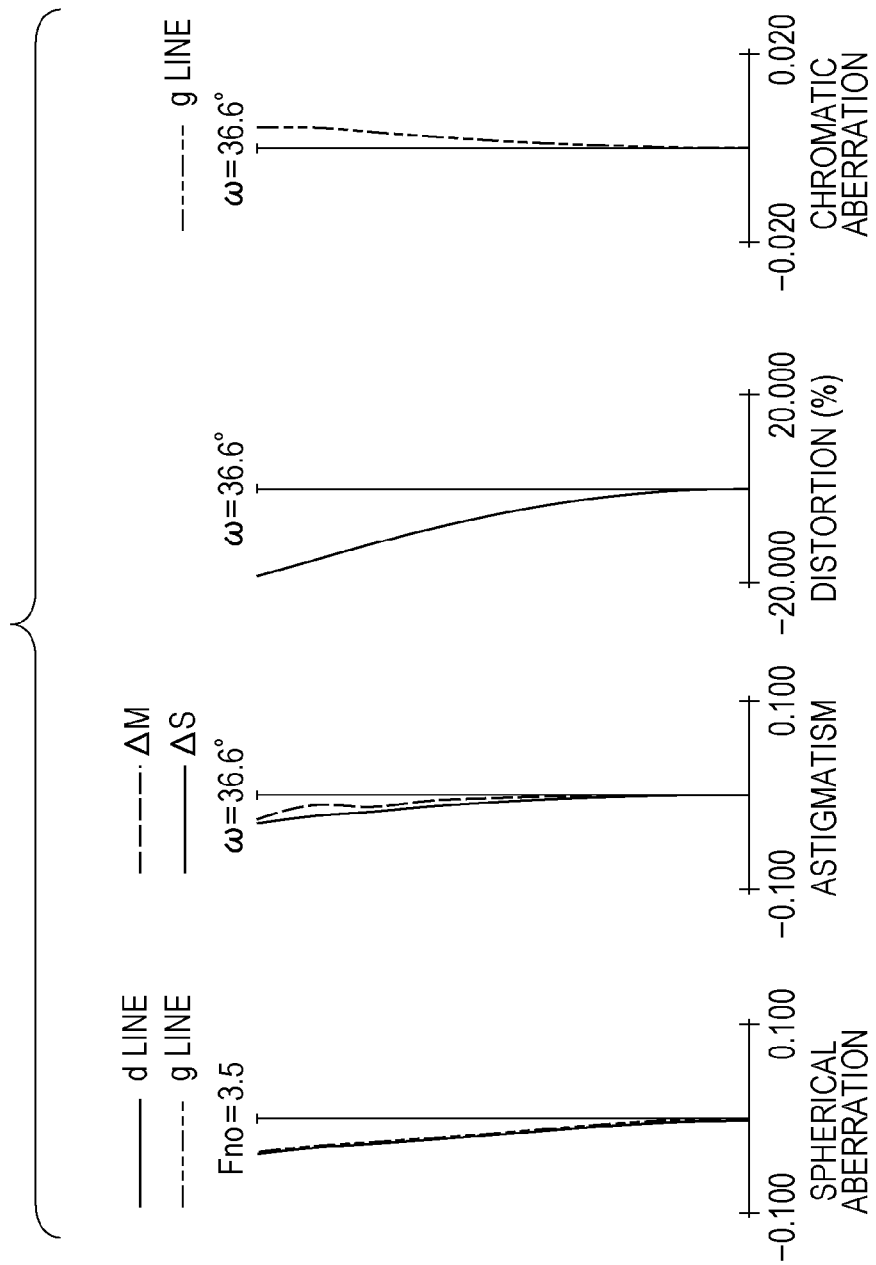

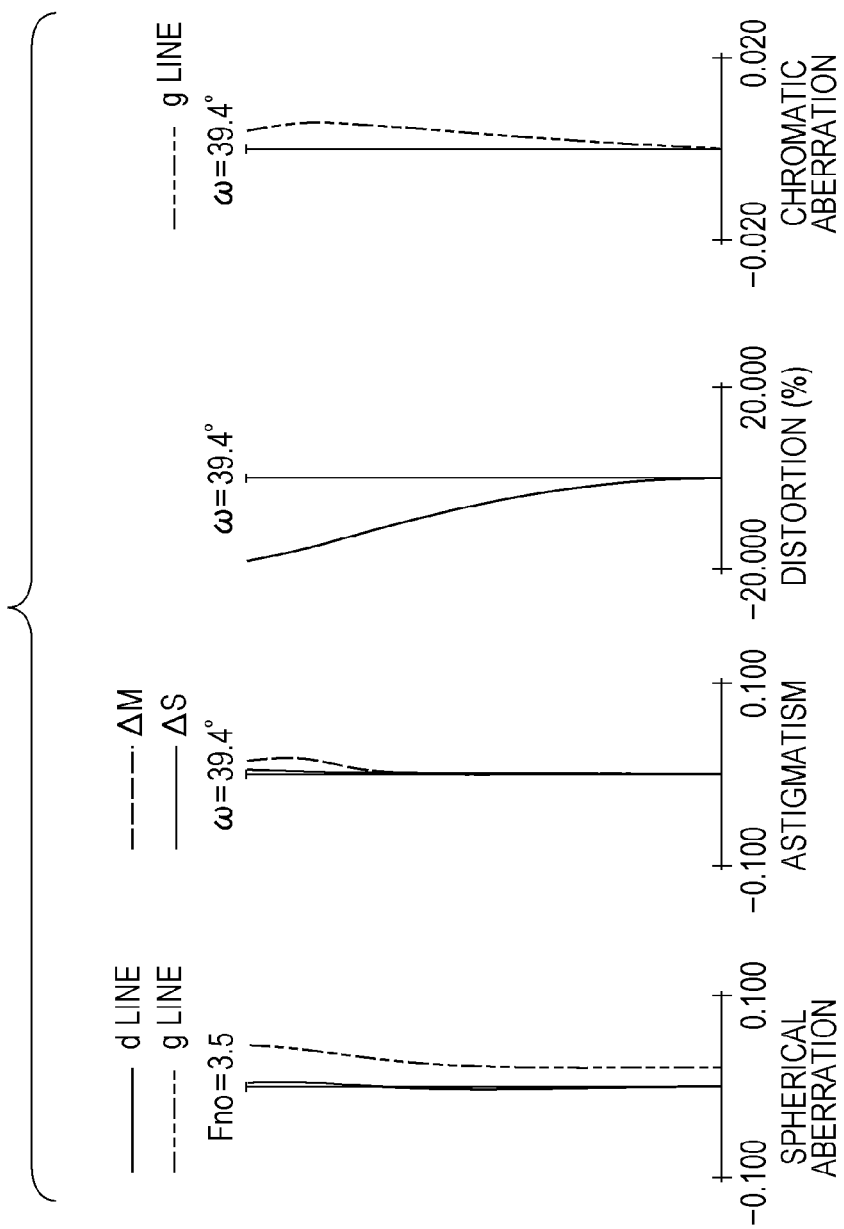

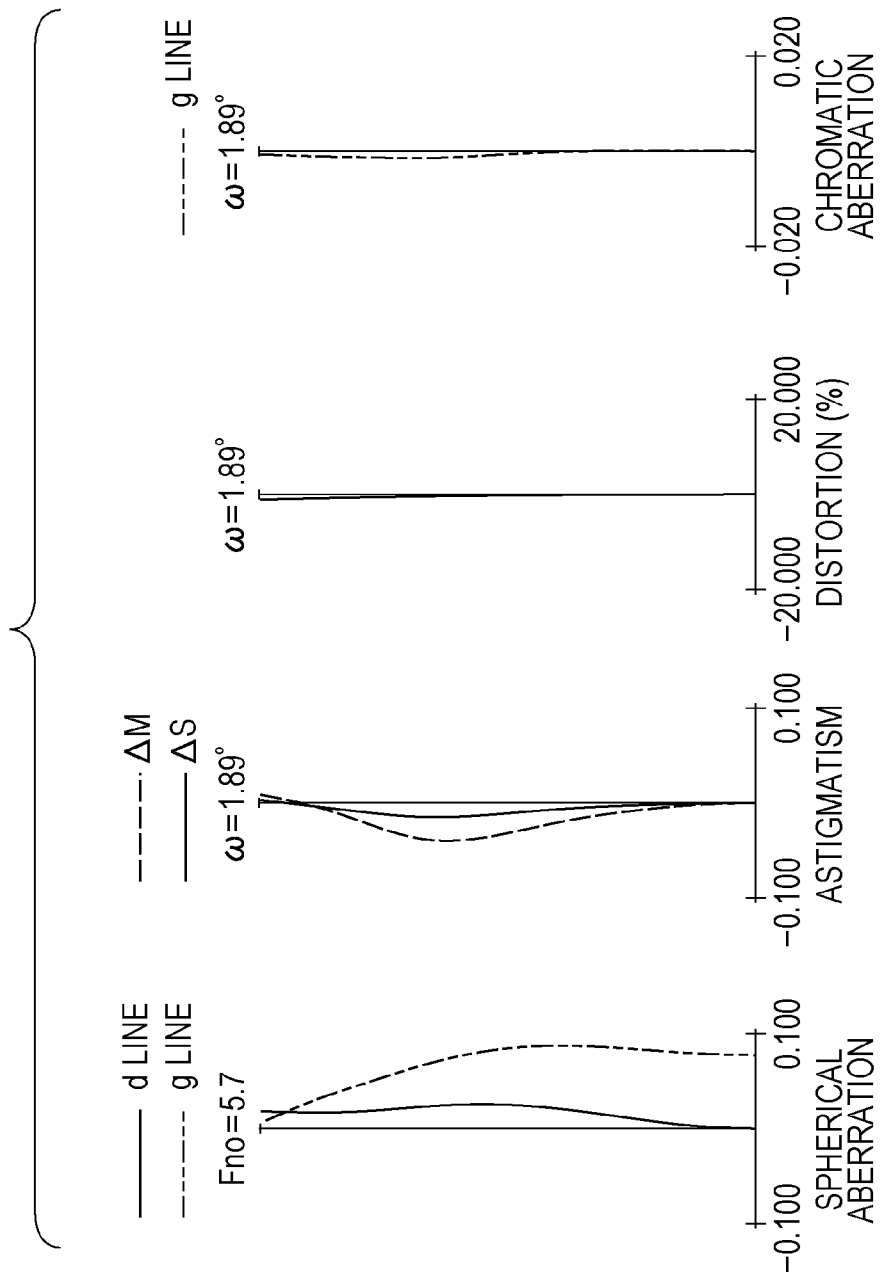

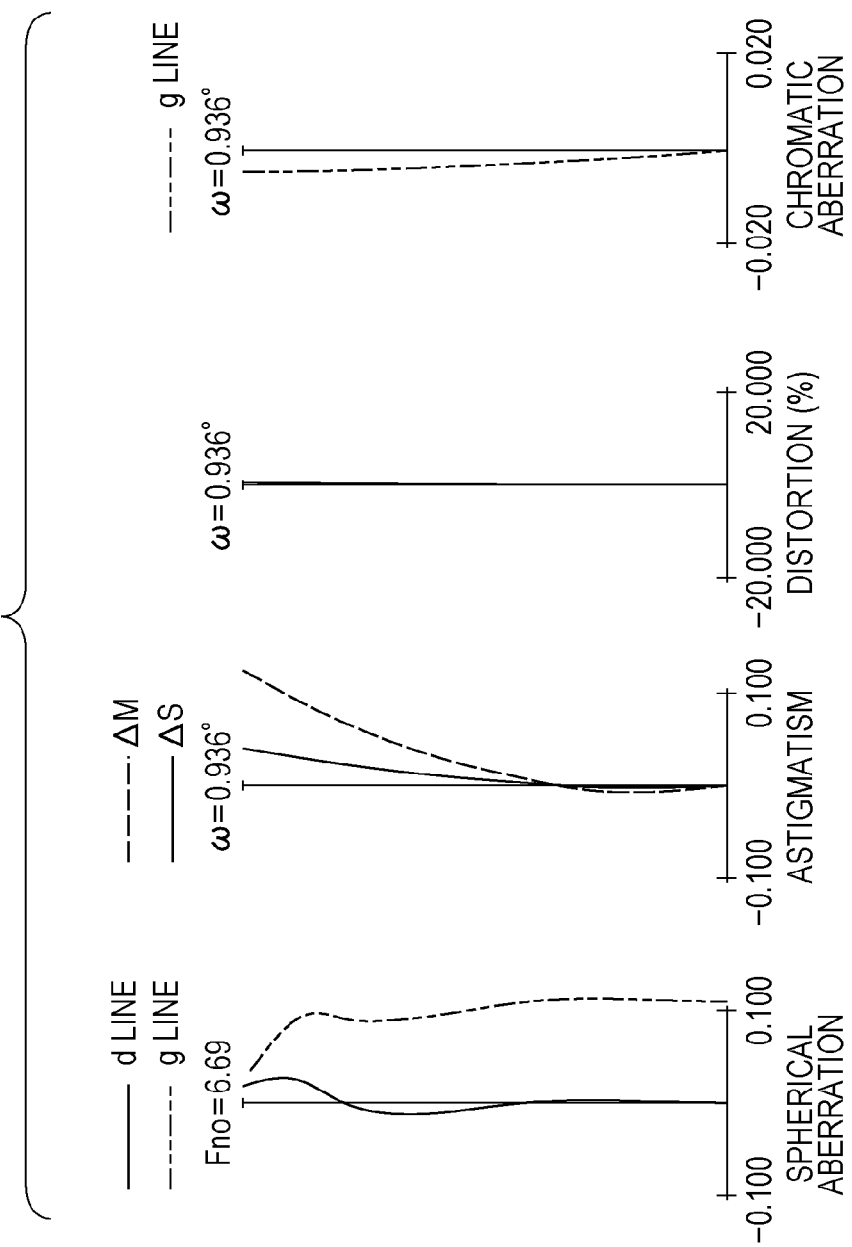

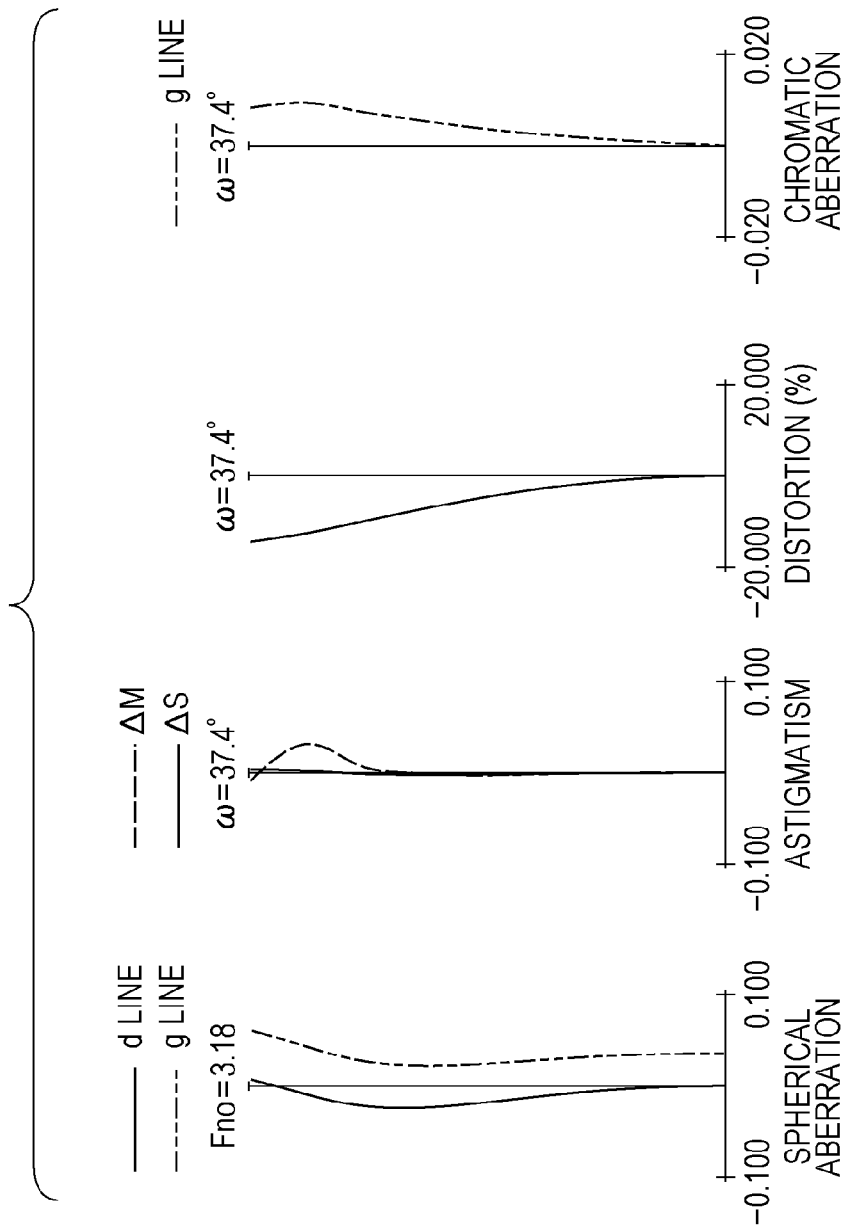

ZOOM LENS AND IMAGE PICKUP APPARATUS HAVING THE SAME

BACKGROUND OF THE INVENTION

1. Field of the Invention

This disclosure relates to a zoom lens and an image pickup apparatus having the zoom lens; the zoom lens is believed suitable for image pickup apparatuses using a solid state image pickup element such as digital still cameras, video cameras, monitoring cameras, broadcasting cameras and the like, or for image pickup apparatuses using silver halide film such as analog photography cameras and the like.

2. Description of the Related Art

In recent years, functions of image pickup apparatuses such as digital still cameras, video cameras, and the like using a solid image pickup element have improved and the size of such image pickup apparatuses has been reduced. A zoom lens used in these image pickup apparatuses is required to have a high magnification, wide viewing angle, a compact profile, and a favorable optical performance in the entire zoom range. To that end, a five-unit zoom lens comprising lens units having refractive powers of positive, negative, positive, negative, and positive from an object side to an image side in this order is known.

In the five-unit zoom lens, when the magnification of the zoom lens is increased, a focal length at a telephoto end is increased, and an on-axis chromatic aberration occurs often. In order to reduce the on-axis chromatic aberration, a zoom lens described in Japanese Patent Laid-Open No. 2012-220920 is formed of an anomalous dispersion glass material as a material of a positive lens included in the third lens unit.

In general, in order to obtain an image pickup optical system having a compact profile and a high magnification, the number of lenses which constitute each lens unit may be reduced while increasing a refracting power of each lens unit which constitutes part of the image pickup optical system. However, if the refracting power of the lens unit is increased, the refracting power of lens surfaces of the lenses which constitute the lens unit is increased, so that the lens thickness is increased in order to secure an edge thickness of the lens correspondingly. Consequently, a foremost lens diameter (effective diameter of the foremost lens) is increased, and hence a reduction in size of an optical system becomes difficult. In addition, by an increase in focal length at the telephoto end, chromatic aberration occurs often, so that a correction becomes difficult.

SUMMARY OF THE INVENTION

The various embodiments described in the present invention disclose a zoom lens including, from an object side to an image side, a first lens unit having a positive refractive power, a second lens unit having a negative refractive power, a third lens unit having a positive refractive power, a fourth lens unit having a negative refractive power, and a fifth lens unit having a positive refractive power in this order, wherein during zooming the lens units move to draw predetermined loci such that an interval between adjacent lens units varies, and the first lens unit and the third lens unit move toward the object side at the telephoto end in comparison with a wide angle end, wherein the third lens unit includes at least two positive lenses formed of a material which satisfies the following conditional expressions, $$\theta gF3P-(-1.665\times 10^{-7}\cdot vd3P^3+5.213\times 10^{-5}\cdot vd3P^2-5.656\times 10^{-3}\cdot vd3P+0.737)>0$$

$$50.0<vd3P<100.0$$

where $\theta gF3P$ is a partial dispersion ratio of the material and $vd3P$ is the Abbe number of the positive lens included in the third lens unit, and wherein the zoom lens satisfies the following conditional expressions $$0/01<f3/ft<0.15$$

$$0.5<|f4/f3|<2.5$$

$$3.00<M3/fw<30.00$$

where fw is a focal length of the zoom lens at the wide angle end, ft is a focal length of the zoom lens at the telephoto end, f3 is a focal length of the third lens unit, f4 is a focal length of the fourth lens unit, and M3 is an amount of movement of the third lens unit at the time of zooming from the wide angle end to the telephoto end.

Further features of the present invention will become apparent from the following description of exemplary embodiments with reference to the attached drawings.

BRIEF DESCRIPTION OF THE DRAWINGS

FIGS. 2A, 2B, and 2C are aberration diagrams at the wide angle end, an intermediate zoom position, and a telephoto end, respectively, of the zoom lens of Example 1.

FIGS. 4A, 4B, and 4C are aberration diagrams at the wide angle end, an intermediate zoom position, and the telephoto end, respectively, of the zoom lens of Example 2.

FIGS. 6A, 6B, and 6C are aberration diagrams at the wide angle end, the intermediate zoom position, and the telephoto end, respectively, of the zoom lens of Example 3.

FIGS. 8A, 8B, and 8C are aberration diagrams at the wide angle end, the intermediate zoom position, and the telephoto end, respectively, of the zoom lens of Example 4.

FIGS. 10A, 10B, and 10C are aberration diagrams at the wide angle end, the intermediate zoom position, and the telephoto end, respectively, of the zoom lens of Example 5.

DESCRIPTION OF THE EMBODIMENTS

Hereinafter, a zoom lens of this disclosure and an image pickup apparatus having the zoom lens will be described in detail with reference to the attached drawings. The zoom lens of this disclosure includes a first lens unit having a positive refractive power, a second lens unit having a negative refractive power, a third lens unit having a positive refractive power, a fourth lens unit having a negative refractive power, and a fifth lens unit having a positive refractive power in this order from an object side to an image side. The "lens unit" here needs only to have one or more lenses, and a plurality of lenses does not necessarily have to be provided.

Figure 1:
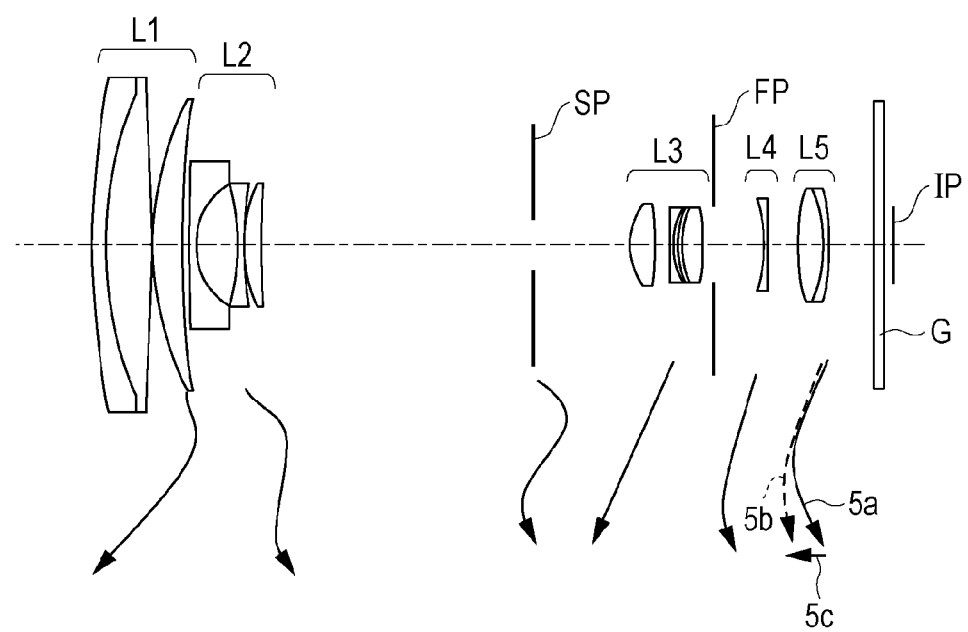
FIG. 1 is a cross-sectional view of a lens at a wide angle end of a zoom lens of Example 1.
Figure 3:
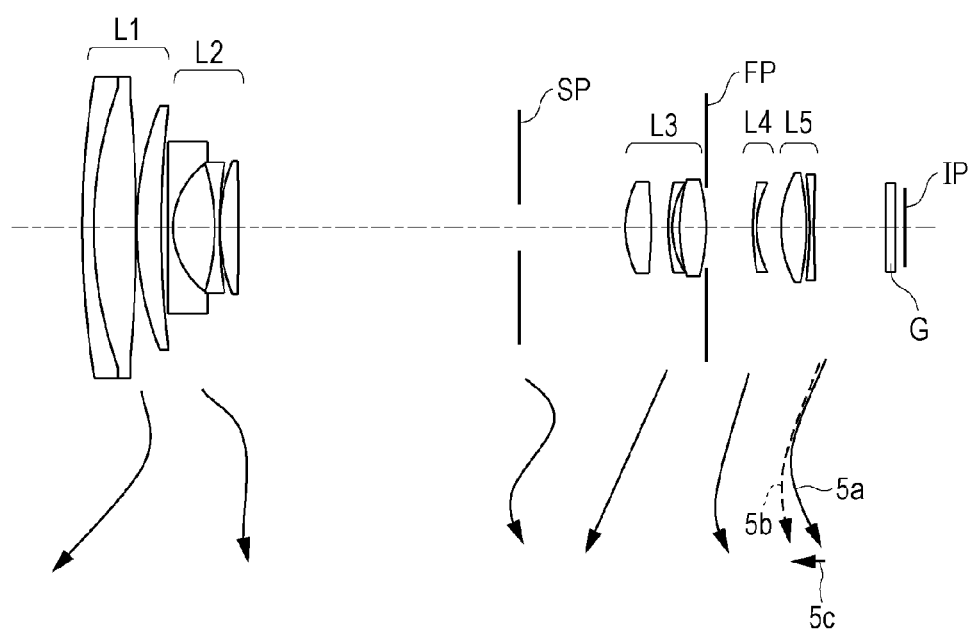
FIG. 3 is a cross-sectional view of the lens at the wide angle end of the zoom lens of Example 2.

FIG. 1 is a cross-sectional view of a lens at a wide angle end of the zoom lens of Example 1. FIGS. 2A, 2B, and 2C are aberration diagrams at the wide angle end, an intermediate zoom position, and the telephoto end of the zoom lens of Example 1, respectively. Example 1 is the zoom lens on the order of a zoom ratio of 39.57, and an aperture ratio on the order of 3.50 to 6.08. FIG. 3 is a cross-sectional view of a lens at the wide angle end of the zoom lens of Example 2. FIGS. 4A, 4B, and 4C are aberration diagrams at the wide angle end, the intermediate zoom position, and the telephoto end of the zoom lens of Example 2, respectively. Example 2 is the zoom lens on the order of a zoom ratio of 32.71, and an aperture ratio on the order of 3.50 to 6.08.

Figure 5:
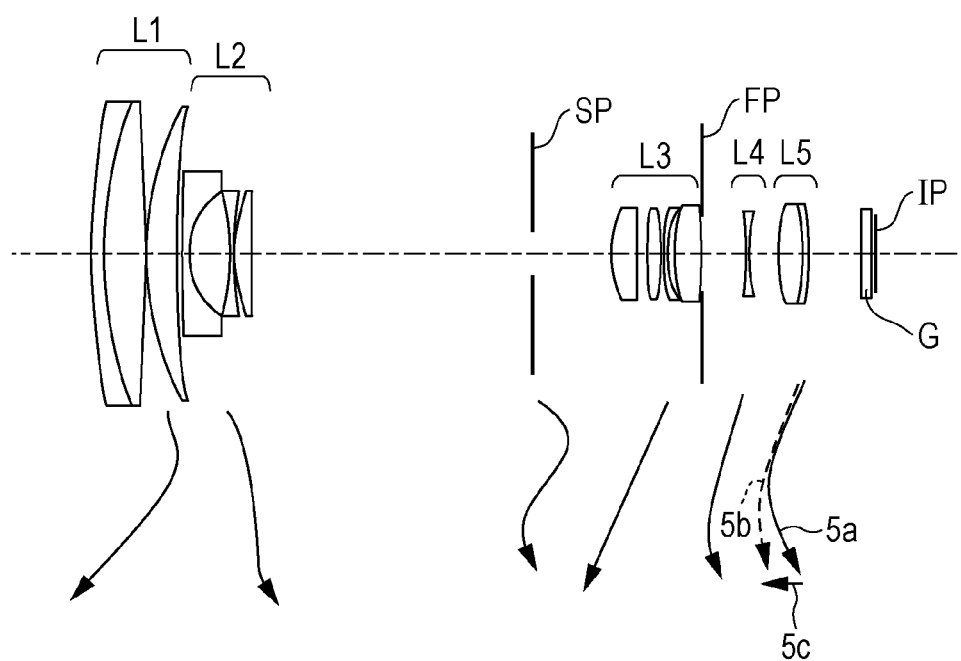
FIG. 5 is a cross-sectional view of the lens at the wide angle end of the zoom lens of Example 3.
Figure 6B:
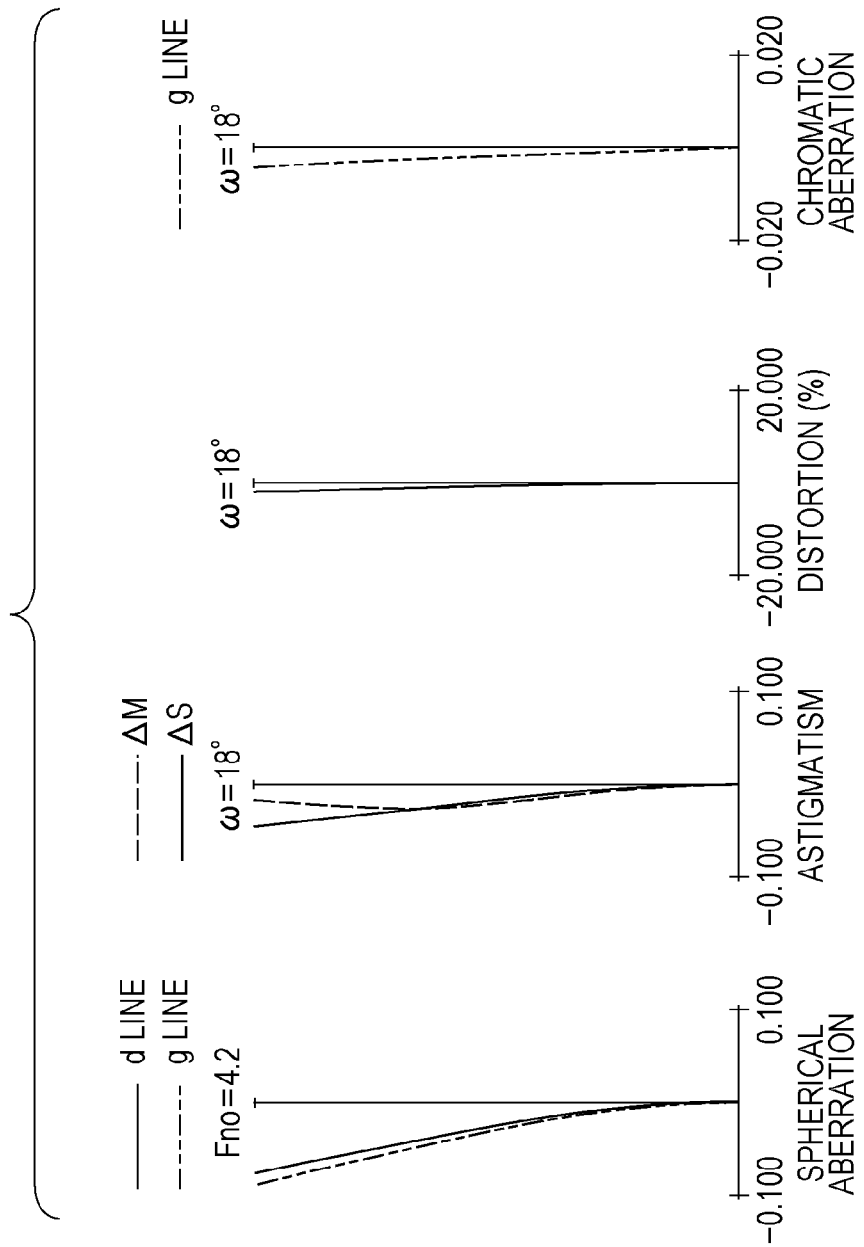
Figure 6C:
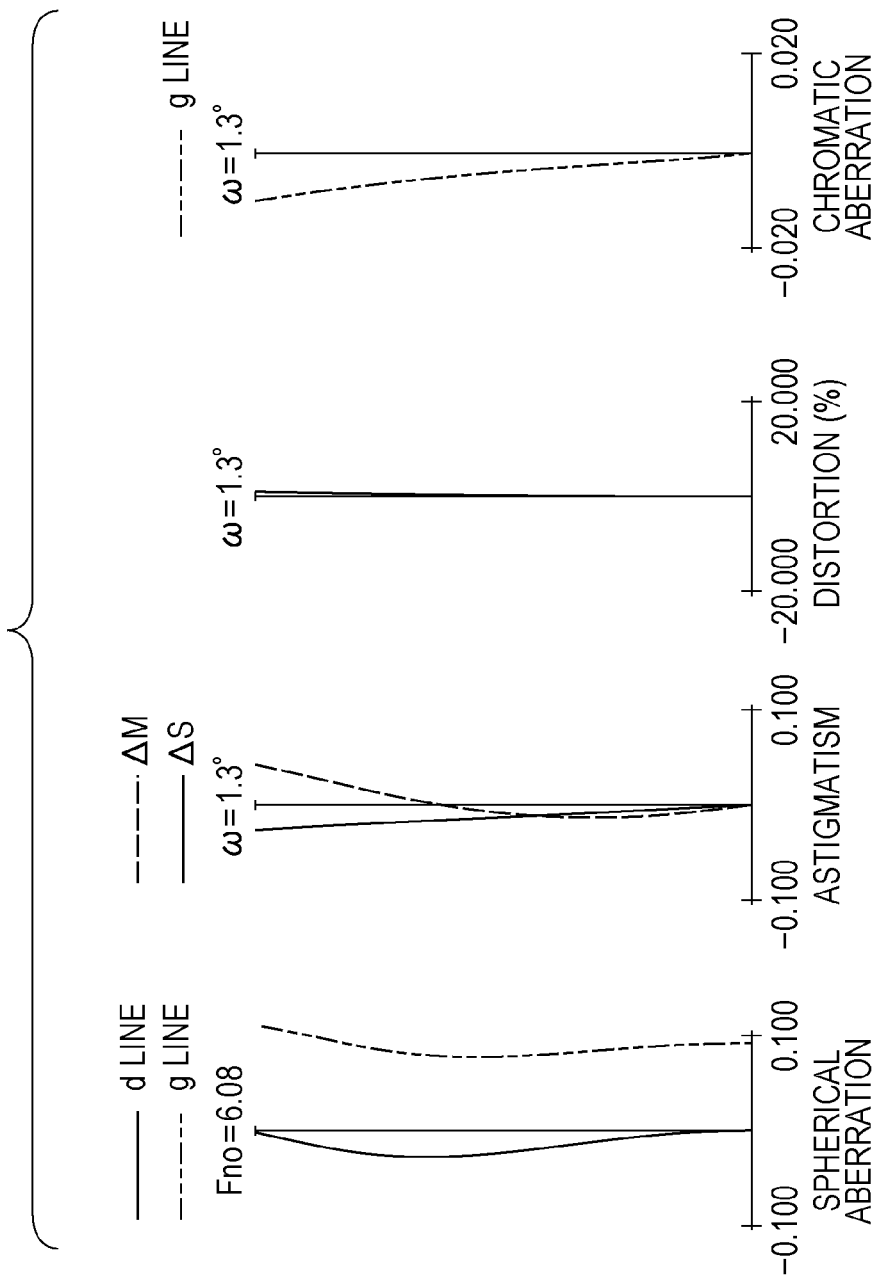
Figure 7:
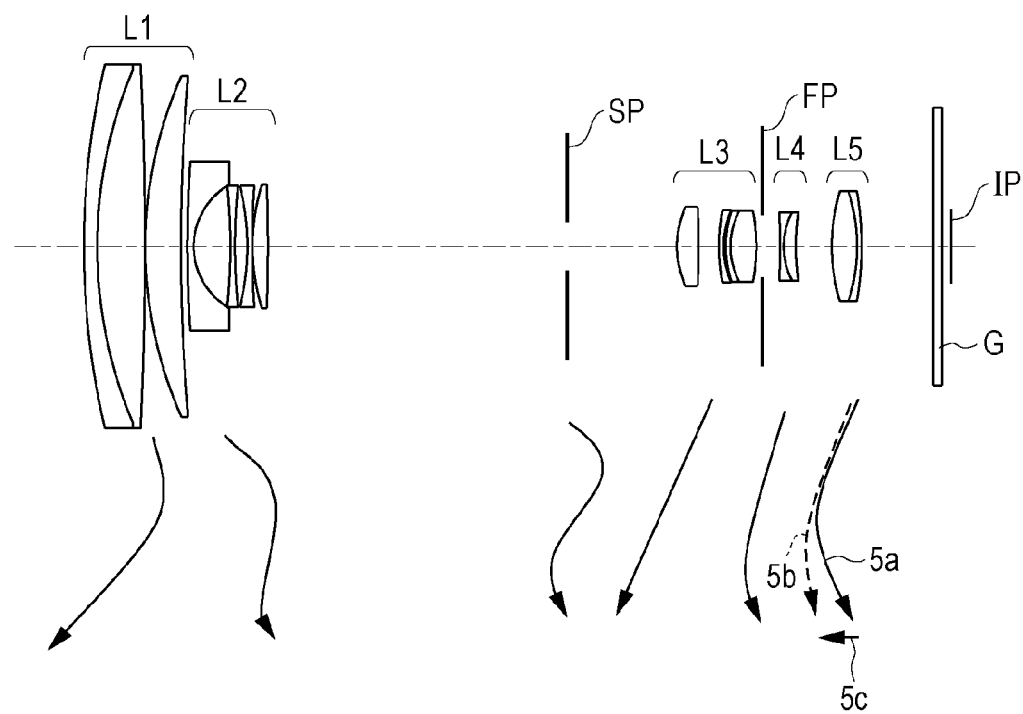
FIG. 7 is a cross-sectional view of the lens at the wide angle end of the zoom lens of Example 4.

FIG. 5 is a cross-sectional view of the lens at the wide angle end of the zoom lens of Example 3. FIGS. 6A, 6B, and 6C are aberration diagrams at the wide angle end, the intermediate zoom position, and the telephoto end of the zoom lens of Example 3, respectively. Example 3 is the zoom lens on the order of a zoom ratio of 38.66, and an aperture ratio on the order of 3.50 to 6.08. FIG. 7 is a cross-sectional view of the lens at the wide angle end of the zoom lens of Example 4. FIGS. 8A, 8B, and 8C are aberration diagrams at the wide angle end, the intermediate zoom position, and the telephoto end of the zoom lens of Example 4, respectively. Example 4 is the zoom lens on the order of a zoom ratio of 61.29, and an aperture ratio of 3.50 to 6.69.

Figure 9:
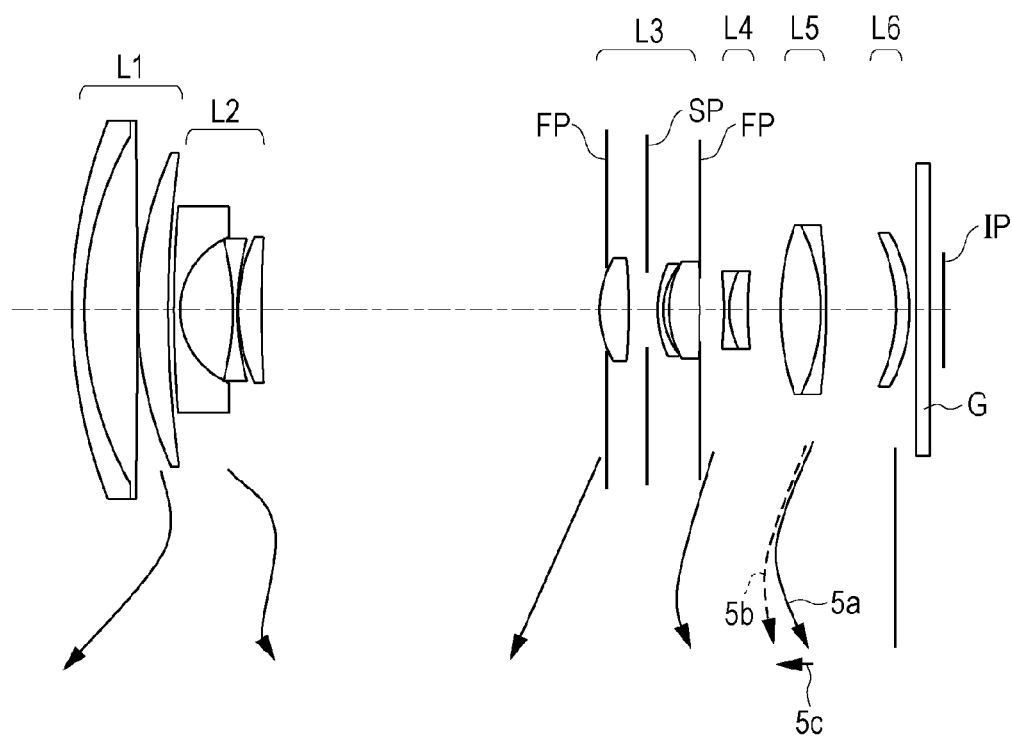
FIG. 9 is a cross-sectional view of the lens at the wide angle end of the zoom lens of Example 5.
Figure 10B:
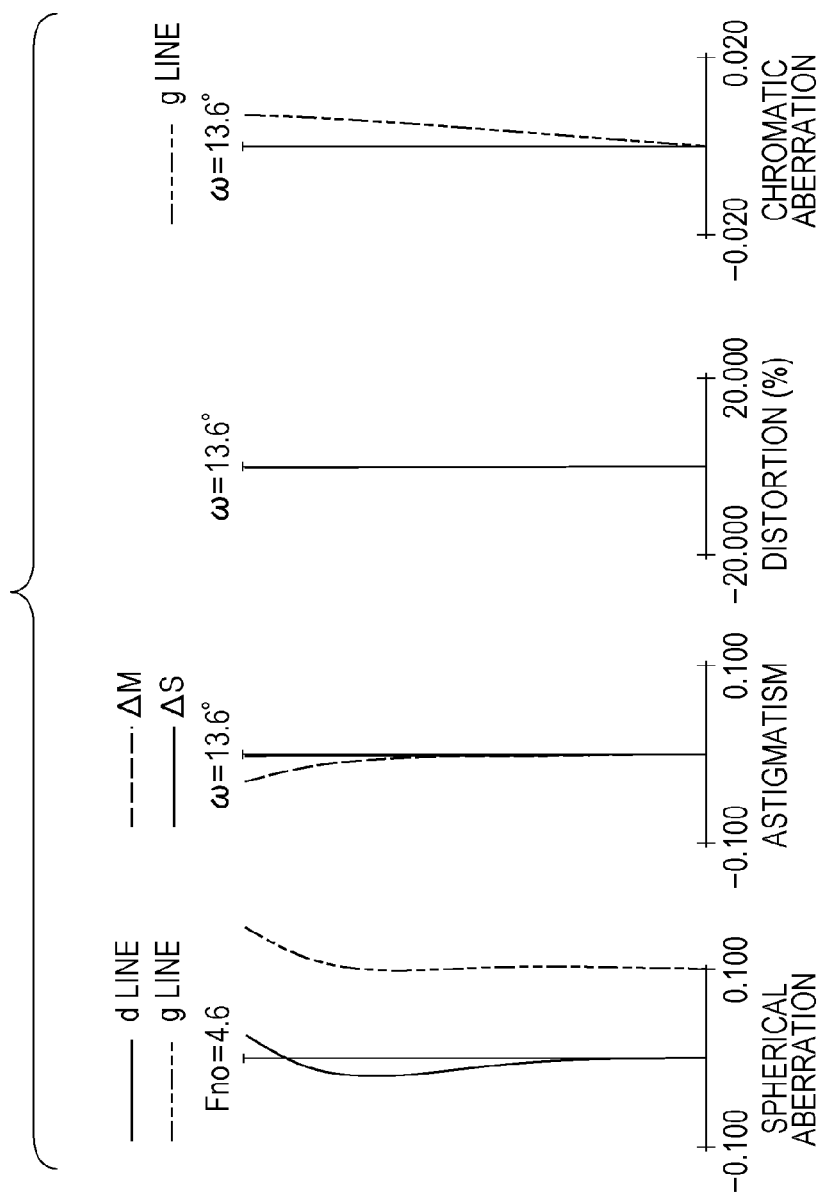
Figure 10C:
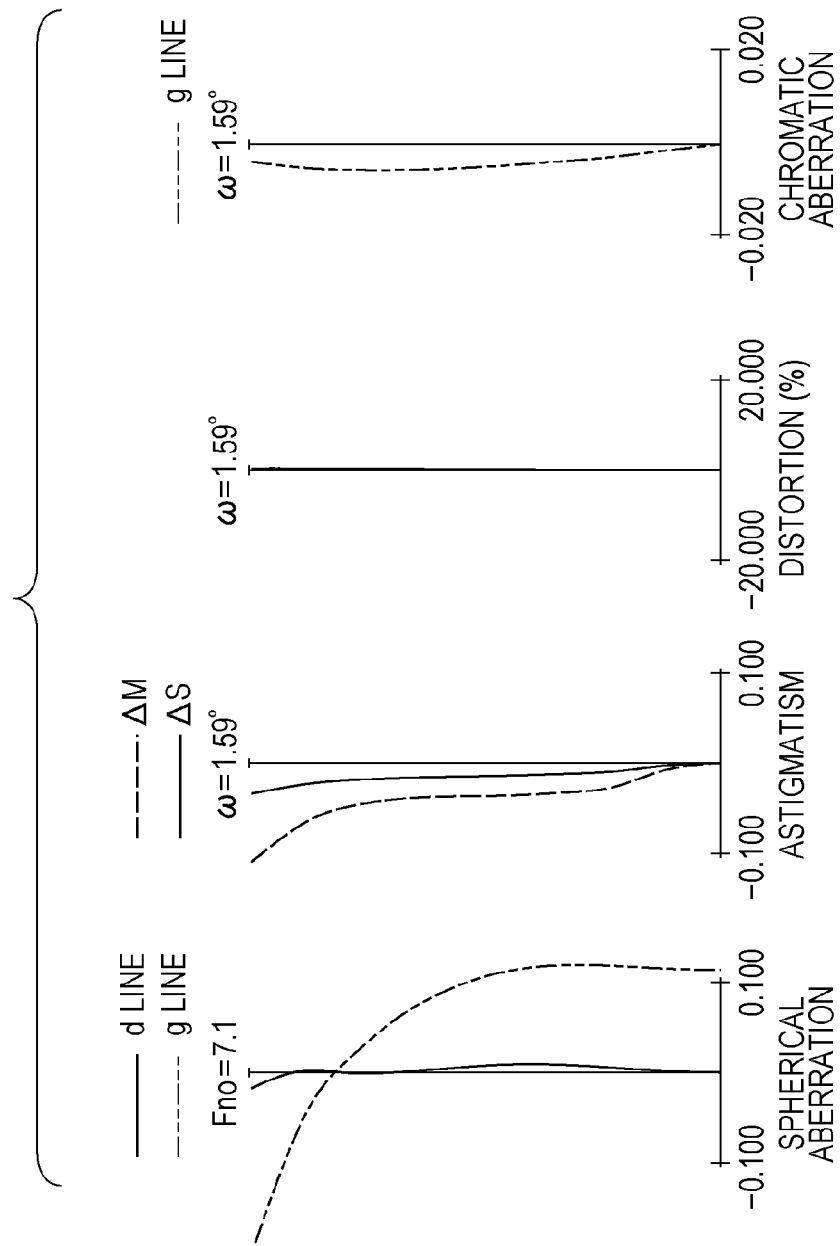

FIG. 9 is a cross-sectional view of the lens at the wide angle end of the zoom lens of Example 5. FIGS. 10A, 10B, and 10C are aberration diagrams at the wide angle end, the intermediate zoom position, and the telephoto end of the zoom lens of Example 5, respectively. Example 5 is the zoom lens on the order of a zoom ratio of 32.15, and an aperture ratio of 3.18 to 7.10.

Figure 11:
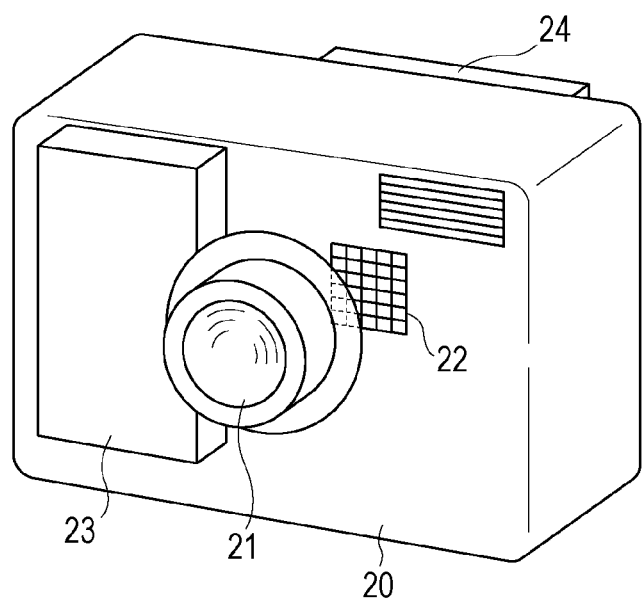
FIG. 11 is a schematic drawing of relevant portions of an image pickup apparatus according to the present disclosure.
Figure 12:
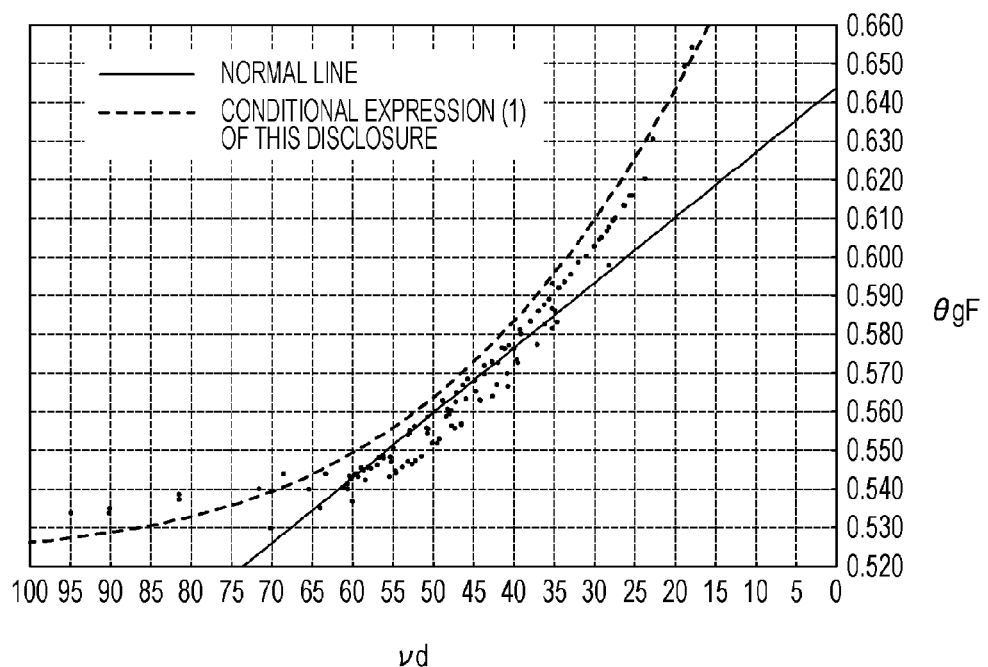
FIG. 12 is an explanatory drawing of "θgF-vd chart".

FIG. 11 is a schematic drawing of a principal portion illustrating a digital still camera (image pickup apparatus) provided with the zoom lens of this disclosure. The zoom lens of each example is an image taking lens system used in the image pickup apparatus such as video cameras, digital still cameras, silver halide photography cameras, TV cameras and the like. In the cross-sectional view of the lens, the left side corresponds to an object side (front side) and the right side is an image side (rear side). In the cross-sectional view of the lens, when i is an order of the lens unit from the object side to the image side, Li indicates an ith lens unit. FIG. 12 is an explanatory drawing of θgF-vd chart.

The zoom lens from Examples 1 to 4 include a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power in this order from the object side to the image side. Examples 1 to 4 is a five-unit zoom lens of a positive lead type including five lens units.

The zoom lens from Example 5 includes the first lens unit L1 having a positive refractive power, the second lens unit L2 having a negative refractive power, the third lens unit L3 having a positive refractive power, the fourth lens unit L4 having a negative refractive power, the fifth lens unit L5 having a positive refractive power in this order from the object side to the image side, and a sixth lens unit L6 having a positive refractive power. Example 5 is a six-unit zoom lens of the positive lead type including six lens units.

In the examples, SP is an aperture stop. In Examples 1 to 4, an aperture stop SP is arranged between the second lens unit L2 and the third lens unit L3, and is arranged in the third lens unit L3 in Example 5. At the time of zooming from the wide angle end to the telephoto end, the aperture stop SP moves along a locus different from each lens unit so as to be positioned on the object side at the telephoto end in comparison with the wide angle end. Accordingly, the position of an incident pupil may be moved to the object side, and hence the effective diameter of the foremost lens may be reduced in size. Reference sign FP denotes a flare cut aperture, is arranged between the second lens unit L2 and the third lens unit L3 or between the third lens unit L3 and the fourth lens unit L4, and is configured to block undesirable light.

G denotes an optical block corresponding to an optical filter, a face plate, a low-pass filter, an infrared cut filter and the like. Reference sign IP denotes an image surface. When using the zoom lens as an image pickup optical system of a video camera or a digital camera, an image plane IP corresponds to a solid image pickup element (photoelectric conversion element) such as a CCD sensor, and a CMOS sensor. When using the zoom lens as an image pickup optical system for a silver salt film camera, the image plane IP corresponds to a film surface.

In the spherical aberration diagram, Fno represents F number, and indicates a spherical aberration with respect to d-line (wavelength: 587.6 nm) and g-line (wavelength 435.8 nm). In the astigmatism aberration diagram, ΔS is a sagittal image plane and ΔM is a Meridional image plane. A distortion aberration indicates that of the d-line. The magnification chromatic aberration diagram indicates a magnification chromatic aberration of the g-line. Reference sign ω denotes a half angle of view. In the following examples, terms "wide angle end" and "telephoto end" are respectively zoom positions when a variable magnification lens unit is mechanically moved to be positioned at respective ends of a movable range on the optical axis.

In the examples, lens units move either to the object side (left side of the figure) or image side (right side of the figure) following a path as indicated by arrows in the cross-sectional view of the lens at the time of zooming from the wide angle end to the telephoto end, and the intervals of the adjacent lens units vary.

Specifically, in the examples, the first lens unit L1 moves so as to draw a locus of a projecting shape to the image side at the time of zooming from the wide angle end to the telephoto end. The second lens unit L2 moves so as to be positioned on the image side at the telephoto end rather than at the wide angle end. The third lens unit L3 moves so as to be positioned on the object side at the telephoto end rather than at the wide angle end. The fourth lens unit L4 moves so as to be positioned on the object side at the telephoto end rather than at the wide angle end. The fifth lens unit L5 moves so as to draw a locus of the projecting shape to the object side at the time of zooming from the wide angle end to the telephoto end. With the zoom lens of Example 5, the sixth lens unit L6 is immobile at the time of zooming from the wide angle end to the telephoto end.

In the embodiments, the fifth lens unit L5 corresponds to a focus lens unit. In the examples, in the case of focusing from an infinity object to a short-distance object at the telephoto end, the fifth lens unit L5 is expanded toward the object as indicated by an arrow 5c of the cross section of the lens. A solid line 5a and a dotted line 5b in the cross-sectional view of the lens indicate loci of movement of the lens for compensating variation of the image plane in association with zooming from the wide angle end to the telephoto end when focusing on the infinity object and the short-distance object.

In the examples, the interval between the second lens unit L2 and the third lens unit L3 at the telephoto end can be reduced by moving the aperture stop SP along a locus different from the lens units at the time of zooming. Accordingly, an entire length of the lens at the telephoto end may be reduced.

In the examples, the first lens unit L1 and the third lens unit L3 are positioned on the object side at the telephoto end rather than at the wide angle end. Accordingly, the high magnification of the zoom lens can be realized while reducing the entire length of the lens at the wide angle end.

In the examples, reduction in chromatic aberration is achieved by using the lens formed of a material having an anomalous dispersion property. A method of reducing the chromatic aberration by using the material having the anomalous dispersion property will be described below.

FIG. 12 is a graph having a vertical axis indicating a partial dispersion ratio θgF increasing as it goes up and a lateral axis indicating an Abbe number increasing as it goes leftward (hereinafter, referred to as "θgF-vd chart") in a general optical glass. When mapping a material on this θgF-vd chart, a distribution appears along a straight line referred to as a normal line is known. In this disclosure the normal line is expressed by the following expression $$\theta gF = -0.001682 \times vd + 0.6438.$$

Here, the Abbe number vd, and the partial dispersion ratio θgF are values expressed by the expressions $$vd = (Nd-1)/(NF-NC)$$

$$\theta gF = (Ng-NF)/(NF-NC)$$

where Ng, NF, NC, and Nd are refractive indexes of the material with respect to the g-line (wavelength: 435.8 nm), the F-line (486.1 nm), and the C-line (656.3 nm), and the d-line (587.6 nm).

In the zoom lens of the positive lead type having a long focal length, on-axis beam passes through a relatively high position in the third lens unit L3. Therefore, an on-axis chromatic aberration or the spherical aberration tend to occur in the third lens unit L3. If the correction of the spherical aberration is performed at a plurality of frequencies at the telephoto end, the on-axis chromatic aberration is increased, so that a secondary spectrum of the on-axis chromatic aberration is preferably as small as possible.

In the third lens unit L3, in order to reduce the secondary spectrum of the on-axis chromatic aberration, making an inclination of the line connecting glass materials of the positive lenses and the negative lens which constitute the third lens unit gentle in the θgF-vd chart is necessary.

For example, a material having a large Abbe number vd and existing in an area away from the normal line in the direction in which the partial dispersion ratio θgF increases in the θgF-vd chart such as fluorite is preferably used for the positive lens included in the third lens unit L3. For example, a material existing in an area away from the normal line in the direction in which the partial dispersion ratio θgF decreases in the θgF-vd chart such as glass material of lanthanum system is preferably used for the negative lens included in the third lens unit L3.

With this combination, the inclination of the line connecting the glass materials which constitute the positive lenses and the negative lens included in the third lens unit L3 becomes smaller than the normal line, and the secondary spectrum of the on-axis chromatic aberration may be desirably corrected. In this manner, by optimizing the materials of the lenses included in the third lens unit L3, the secondary spectrum of the on-axis chromatic aberration may be desirably corrected.

In the examples, by using at least two positive lenses formed of a material satisfying the following conditional expression in the third lens unit L3, further efficient correction of the chromatic aberration is achieved in comparison with the case by using only one positive lens formed of a material satisfying the conditional expression.

$$\theta gF3P - (-1.665 \times 10^{-7} \cdot vd3P^3 + 5.213 \times 10^{-5} \cdot vd3P^2 - 5.656 \times 10^{-3} \cdot vd3P + 0.737) > 0 \quad (1)$$

$$50.0 < vd3P < 100.0 \quad (2)$$

Here, the partial dispersion ratio and the Abbe number of the material for the positive lens included in the third lens unit L3 are defined as θgF3P and vd3P, respectively.

If the left side of the conditional expression (1) is smaller than "0", the secondary spectrum of the on-axis chromatic aberration at the telephoto end is increased, and hence is not preferable.

If the Abbe number vd3P of the positive lens included in the third lens unit L3 is increased beyond the upper limit value of the conditional expression (2), the glass material existing in the range satisfying the range of the numerical value of the conditional expression (1) is disadvantageously limited, which is not preferable.

If the Abbe number vd3P of the positive lens included in the third lens unit L3 is decreased beyond a lower limit value of the conditional expression (2), a radius of curvature of the positive lenses included in the third lens unit L3 is reduced for correcting the chromatic aberration. Consequently, in order to secure the edge thickness, the thickness of the lens is increased, and which disadvantageously leads to an increase in the entire length of the lens.

In the examples, the following conditional expressions (3) to (5) are satisfied. Here, fw is a focal length of the entire system at the wide angle end, ft is a focal length of the entire system at the telephoto end, f3 is a focal length of the third lens unit L3, and f4 is a focal length of the fourth lens unit L4. Furthermore, the conditional expressions (3) to (5) are expressed as $$0.01 < f3/ft < 0.15 \quad (3)$$

$$0.5 < |f4/f3| < 2.5 \quad (4)$$

$$3.00 < M3/fw < 30.00 \quad (5)$$

where the amount of movement of the third lens unit L3 in the direction of the optical axis at the time of zooming from the wide angle end to the telephoto end is expressed as M3.

The term "amount of movement" corresponds to the difference in position on the optical axis between the lens units at the wide angle end and the telephoto end, and a positive sign of the amount of movement indicates the position on the object side at the telephoto end rather than at the wide angle end, and a negative sign thereof indicates the position on the image side at the telephoto end rather than at the wide angle end.

If the focal length f3 of the third lens unit L3 increases beyond the upper limit value of the conditional expression (3), the refracting power of the third lens unit L3 becomes too weak. Consequently, in order to achieve the high magnification of the zoom lens, the amount of movement of the third lens unit L3 needs to be increased, and the entire length of the lens is disadvantageously increased.

If the focal length f3 of the third lens unit L3 decreases beyond the lower limit value of the conditional expression (3), the refracting power of the third lens unit L3 becomes too strong. Consequently, the spherical aberration, a coma aberration, or the on-axis chromatic aberration disadvantageously occurs often mainly at the telephoto end.

If the focal length f4 of the fourth lens unit L4 is increased beyond the upper limit value of the conditional expression (4) in comparison with the focal length f3 of the third lens unit L3, the refracting power of the fourth lens unit L4 is decreased. Consequently, correction of the spherical aberration, the coma aberration, and the on-axis chromatic aberration occurring in the third lens unit L3 by the fourth lens unit L4 disadvantageously becomes difficult.

If the focal length f3 of the third lens unit L3 is increased beyond the lower limit value of the conditional expression (4) in comparison with the focal length f4 of the fourth lens unit L4, the refracting power of the third lens unit L3 is decreased. Consequently, the share of variable power of the third lens unit L3 is reduced, and in order to achieve the high magnification of the zoom lens, the amount of movement of the third lens unit L3 needs to be increased, and the entire length of the lens is disadvantageously increased.

If the amount of movement M3 of the third lens unit L3 is increased beyond the upper limit value of the conditional expression (5), the entire length of the lens is disadvantageously increased.

If the amount of movement M3 of the third lens unit L3 is reduced beyond the lower limit value of the conditional expression (5), the refracting power of the third lens unit L3 needs to be increased in order to achieve the high magnification. Consequently, the spherical aberration, the coma aberration, and the on-axis chromatic aberration disadvantageously occurs often mainly at the telephoto end.

In the examples, as described above, the elements are adequately set so as to satisfy the conditional expressions (1) to (5). Accordingly, the zoom lens having a high magnification, a wide viewing angle, a compact profile, and a desirably corrected chromatic aberration is obtained.

In the examples, the range of the numeric varies of the conditional expressions (2) to (5) are preferably determined as follows.

$$60.0 < vd3P < 98.0 \quad (2a)$$

$$0.03 < f3/ft < 0.14 \quad (3a)$$

$$0.7 < |f4/f3| < 2.3 \quad (4a)$$

$$3.03 < M3/fw < 25.00 \quad (5a)$$

Further preferably, the range of numerical values of the conditional expressions (2) to (5) are set as follows.

$$70.0 < vd3P < 97.0 \quad (2b)$$

$$0.05 < f3/ft < 0.13 \quad (3b)$$

$$1.2 < |f4/f3| < 2.2 \quad (4b)$$

$$3.05 < M3/fw < 15.00 \quad (5b)$$

In the examples, preferably, one or more of the following conditional expressions are satisfied. Here, the focal length of the second lens unit L2 is defined as f2, and the amount of movement of the first lens unit L1 in the direction of the optical axis at the time of zooming from the wide angle end to the telephoto end is defined as M1. An average value of Abbe number of the positive lens included in the third lens unit L3 is defined as vd3Pave.

At this time, one or more of the following conditional expressions is preferably satisfied.

$$0.01 < |f4/ft| < 0.25 \quad (6)$$

$$0.01 < |f2/ft| < 0.10 \quad (7)$$

$$2.0 < f3/fw < 8.0 \quad (8)$$

$$0.8 < M1/M3 < 5.0 \quad (9)$$

$$71.0 < vd3Pave < 100.0 \quad (10).$$

If the focal length f4 of the fourth lens unit L4 increases beyond the upper limit value of the conditional expression (6), the refracting power of the fourth lens unit L4 is decreased. Consequently, correction of the spherical aberration, the coma aberration, and the on-axis chromatic aberration occurring in the third lens unit L3 by the fourth lens unit L4 at the telephoto end disadvantageously becomes difficult.

If the focal length f4 of the fourth lens unit L4 is decreased beyond the lower limit value of the conditional expression (6), the refracting power of the fourth lens unit L4 is increased, and sufficient correction of the chromatic aberration and the coma aberration in the entire zoom range becomes disadvantageously difficult.

If the focal length f2 of the second lens unit L2 is increased beyond the upper limit value of the conditional expression (7), the refracting power of the second lens unit L2 is decreased, so that the amount of movement of the second lens unit L2 at the time of zooming is needed to be increased in order to achieve the high magnification. Consequently, the entire length of the lens is disadvantageously increased.

If the focal length f2 of the second lens unit L2 is decreased beyond the lower limit value of the conditional expression (7), the refracting power of the second lens unit L2 is increased, and sufficient correction of the coma aberration and in the zoom range from the wide angle end to the intermediate zoom area becomes disadvantageously difficult.

If the focal length f3 of the third lens unit L3 is increased beyond the upper limit value of the conditional expression (8), the refracting power of the third lens unit L3 is decreased, so that the amount of movement of the second lens unit L2 at the time of zooming is needed to be increased in order to achieve the high magnification. Consequently, the entire length of the lens is disadvantageously increased.

If the focal length f3 of the third lens unit L3 is decreased beyond the lower limit value of the conditional expression (8), the refracting power of the third lens unit L3 is increased, and correction of the spherical aberration or the coma aberration in the entire zoom range becomes disadvantageously difficult.

If the amount of movement M1 of the first lens unit L1 is increased more than the amount of movement M3 of the third lens unit L3 beyond the upper limit value of the conditional expression (9), the entire length of the lens at the telephoto end is disadvantageously increased.

If the amount of movement M1 of the first lens unit L1 is reduced to be smaller than the amount of movement M3 of the third lens unit L3 beyond the lower limit value of the conditional expression (9), the refracting power of the first lens unit L1 needs to be increased in order to achieve the high magnification. Consequently, correction of the spherical aberration and the spherical aberration mainly at the telephoto end becomes disadvantageously difficult.

If the average value of Abbe number vd3Pave of the positive lens included in the third lens unit L3 is increased too much beyond the upper limit value of the conditional expression (10), sufficient correction of the chromatic aberration cannot disadvantageously be achieved with the material in the range which satisfies the numerical range of the conditional expression (1).

If the average value of Abbe number vd3Pave of the positive lens included in the third lens unit L3 is decreased too much beyond the lower limit value of the conditional expression (10), sufficient correction of the on-axis chromatic aberration mainly at the telephoto end cannot disadvantageously be achieved.

Preferably, if the range of the numerical values of the conditional expressions (6) to (10) are set as given below, the effects of the respective conditional expressions are maximized.

$$0.05 < |f4/ft| < 0.24 \quad (6a)$$

$$0.02 < |f2/ft| < 0.09 \quad (7a)$$

$$2.2 < f3/fw < 5.0 \quad (8a)$$

$$1.0 < M1/M3 < 4.0 \quad (9a)$$

$$73.0 < vd3Pave < 100.0 \quad (10a)$$

Further preferably, the range of numerical values of the conditional expressions (6) to (10) are set as follows.

$$0.08 < |f4/ft| < 0.24 \quad (6b)$$

$$0.03 < |f2/ft| < 0.08 \quad (7b)$$

$$2.4 < f3/fw < 4.5 \quad (8b)$$

$$1.2 < M1/M3 < 3.0 \quad (9b)$$

$$75.0 < vd3Pave < 95.0 \quad (10b)$$

Subsequently, the configuration of the respective lens units will be described. In the examples, the first lens unit L1 includes a cemented lens composed of a negative lens and a positive lens, and a positive lens from the object side to the image side in this order. With the first lens unit L1 having such a configuration, a reduction in size of the effective diameter of the first lens unit L1 is achieved while restraining occurrence of the spherical aberration and the on-axis chromatic aberration.

The second lens unit L2 in Examples 1 to 3 and 5 includes a negative lens, a negative lens, and a positive lens from the object side to the image side in this order. In Example 4, the second lens unit L2 includes a negative lens, a negative lens, a negative lens, and a positive lens from the object side to the image side in this order.

The third lens unit L3 includes at least two positive lenses in the examples. The third lens unit L3 includes a positive lens, a negative lens, and a cemented lens composed of a negative lens and a positive lens from the object side to the image side in this order in Examples 1 and 4. The material of the two positive lenses has an anomalous dispersion property. In Examples 2 and 5, the third lens unit L3 includes a positive lens, a negative lens, a negative lens, and a positive lens from the object side to the image side in this order. The material of the two positive lenses has the anomalous dispersion property. The third lens unit L3 includes a positive lens, a positive lens, a negative lens, and a positive lens from the object side to the image side in this order in Example 3. The material of the three positive lenses has the anomalous dispersion property. By arranging a plurality of positive lenses formed of a material having the anomalous dispersion property, desirable correction of the secondary spectrum of the on-axis chromatic aberration mainly at the telephoto end is achieved.

The fourth lens unit L4 includes one negative lens in Examples 1 to 3. The fourth lens unit L4 includes a cemented lens composed of a negative lens and a positive lens from the object side to the image side in this order in Examples 4 and 5.

The fifth lens unit L5 includes a cemented lens composed of a positive lens and a negative lens from the object side to the image side in this order in Examples 1 and 3 to 5. The fifth lens unit L5 includes a positive lens and a negative lens from the object side to the image side in this order in Example 2.

Numerical examples 1 to 5 corresponding to Examples 1 to 5 of this disclosure will be described below. In the respective numerical examples, reference sign i indicates the order of the optical planes from the object side. Reference sign ri indicates a radius of curvature of an ith optical plane (ith plane), reference sign di indicates an interval between the ith plane and the i+1th plane, reference signs ndi and vdi indicate the refractive index and the Abbe number of the material of an ith optical member with respect to the d-line, respectively.

The coefficient of aspherical surface is expressed by the expression $$x=(h2/R)/[1+[1-(1+k)(h/R)2]^{1/2}]+A4h4+A6h6+A8h8$$

where k is eccentricity, A4, A6, and A8 are coefficient of aspherical surface, x is displacement in the direction of the optical axis at a position of height h from the optical axis with reference to a surface top. Reference sign R is a paraxial radius of curvature. Indication of "e-Z" means "$10^{-Z}$". In the numerical examples, the two surfaces closest to the image side are surfaces of the optical blocks such as a filter and a face plate.

In the examples, a back focus (BF) is a distance from the surface of the lens system closest to the image side to the paraxial image plane indicated by an air conversion length. The correspondence with the conditional expressions in the respective numerical examples is shown in Table. Here, the partial dispersion ratio and the Abbe number of the positive lenses included in the third lens unit L3 arranged closest to the object side are defined as θgF3P1 and vd3P1, respectively. In the same manner, a partial dispersion ratio and the Abbe number of the positive lens arranged at the second position from the object side among the positive lenses included in the third lens unit L3 are defined as θgF3P2 and vd3P2, respectively. In Example 3, a partial dispersion ratio and the Abbe number of the positive lens arranged at the third position from the object side among the positive lenses included in the third lens unit L3 are defined as θgF3P3 and vθgF3P3 and vd3P3, respectively.

An effective diameter of the image circle at the wide angle end may be reduced to be smaller than an effective diameter of the image circle at the telephoto end. This is because a barreled distortion aberration which tends to occur on the wide angle side can be corrected by expanding the image by image processing.

| Numerical Example 1 Unit mm | | | | |
|---|---|---|---|---|
| Surface Data | | | | |
| Surface Number | r | d | nd | vd |
| 1 | 97.243 | 1.40 | 1.83400 | 37.2 |
| 2 | 42.106 | 5.21 | 1.49700 | 81.5 |
| 3 | −165.923 | 0.05 | | |
| 4 | 35.705 | 3.26 | 1.48749 | 70.2 |
| 5 | 132.862 | (variable) | | |
| 6 | 655.836 | 0.70 | 1.83481 | 42.7 |
| 7 | 7.967 | 4.58 | | |
| 8 | −24.015 | 0.55 | 1.77250 | 49.6 |
| 9 | 29.301 | 0.15 | | |
| 10 | 17.311 | 1.88 | 1.92286 | 18.9 |
| 11 | 203.966 | (variable) | | |
| 12(Aperture) | ∞ | (variable) | | |
| 13* | 7.438 | 2.75 | 1.55332 | 71.7 |
| 14* | −32.468 | 1.53 | | |
| 15 | 80.047 | 0.45 | 1.83481 | 42.7 |
| 16 | 7.505 | 0.50 | | |
| 17 | 12.182 | 0.45 | 1.84666 | 23.9 |
| 18 | 10.848 | 2.35 | 1.49700 | 81.5 |

-continued

Numerical Example 1
Unit mm

| | | | | |
|---|---|---|---|---|
| 19 | −21.768 | 1.07 | | |
| 20 | ∞ | (variable) | | |
| 21 | −16.900 | 0.40 | 1.48749 | 70.2 |
| 22 | −357.959 | (variable) | | |
| 23 | 26.764 | 2.78 | 1.80100 | 35.0 |
| 24 | −15.262 | 0.50 | 1.95906 | 17.5 |
| 25 | −35.122 | (variable) | | |
| 26 | ∞ | 1.00 | 1.51633 | 64.1 |
| 27 | ∞ | 1.00 | | |
| Image Plane | ∞ | | | |

Non Spherical Data

Thirteen Surface

K = −2.78153e−001 A 4 = −1.03957e−004 A 6 = −9.82869e−007 A 8 = −6.50373e−009
Fourteen Surface K = 0.00000e+000 A 4 = 9.60543e−005 A 6 = −6.09405e−007

Various Data
Zoom Ratio 39.57

| Focal Distance | 4.39 | 11.32 | 173.70 |
|---|---|---|---|
| F NUMBER | 3.50 | 4.20 | 6.08 |
| Half Angle of View | 37.20 | 18.90 | 1.28 |
| Image Height | 3.33 | 3.88 | 3.88 |
| entire lens length | 87.35 | 85.90 | 124.73 |
| BF | 6.75 | 14.58 | 8.97 |
| d 5 | 0.75 | 14.09 | 55.88 |
| d11 | 29.76 | 6.03 | 1.05 |
| d12 | 10.61 | 11.07 | 0.35 |
| d20 | 5.56 | 5.51 | 13.12 |
| d22 | 3.37 | 4.06 | 14.79 |
| d25 | 5.09 | 12.92 | 7.31 |

Zoom Lens Unit Data

| Unit | First Surface | Focal Distance |
|---|---|---|
| 1 | 1 | 73.38 |
| 2 | 6 | −8.63 |
| 3 | 13 | 17.06 |
| 4 | 21 | −36.40 |
| 5 | 23 | 21.76 |

Numerical Example 2
Unit mm

Surface Data

| Surface Number | r | d | nd | vd |
|---|---|---|---|---|
| 1 | 100.839 | 1.20 | 1.83400 | 37.2 |
| 2 | 44.344 | 4.50 | 1.49700 | 81.5 |
| 3 | −155.565 | 0.05 | | |
| 4 | 35.815 | 2.60 | 1.48749 | 70.2 |
| 5 | 111.040 | (variable) | | |
| 6 | 711.806 | 0.60 | 1.83481 | 42.7 |
| 7 | 8.551 | 4.40 | | |
| 8 | −23.679 | 0.50 | 1.83481 | 42.7 |
| 9 | 43.203 | 0.05 | | |
| 10 | 19.665 | 1.95 | 1.92286 | 18.9 |
| 11 | −393.403 | (variable) | | |
| 12(Aperture) | ∞ | (variable) | | |
| 13* | 9.878 | 2.75 | 1.49710 | 81.6 |
| 14* | −50.669 | 1.82 | | |
| 15 | 22.009 | 0.40 | 1.80610 | 33.3 |
| 16 | 8.971 | 0.80 | | |
| 17* | 19.682 | 2.80 | 1.49710 | 81.6 |
| 18* | −19.400 | 0.00 | | |
| 19 | ∞ | (variable) | | |

-continued

Numerical Example 2
Unit mm

| | | | | |
|---|---|---|---|---|
| 20 | 27.418 | 0.40 | 1.53160 | 55.8 |
| 21 | 10.560 | (variable) | | |
| 22 | 12.206 | 2.70 | 1.53160 | 55.8 |
| 23 | −27.140 | 0.30 | | |
| 24 | −48.878 | 0.50 | 1.63550 | 23.9 |
| 25 | 127.959 | (variable) | | |
| 26 | ∞ | 1.00 | 1.51633 | 64.1 |
| 27 | ∞ | 1.00 | | |
| Image Plane | ∞ | | | |

Non Spherical Data

Thirteenth Surface

K = −2.78153e−001 A 4 = −2.36033e−004 A 6 = −9.48302e−007 A 8 = 6.13322e−008
Fourteenth Surface K = 0.00000e+000 A 4 = −1.87163e−004 A 6 = 6.39206e−006
Seventeenth Surface K = 0.00000e+000 A 4 = −1.79997e−004 A 6 = 1.53375e−005
Eighteenth Surface K = 0.00000e+000 A 4 = −1.66398e−004 A 6 = 5.30211e−006

Various Data
Zoom Ratio 32.71

| Focal Distance | 4.43 | 12.79 | 144.89 |
|---|---|---|---|
| F NUMBER | 3.50 | 4.20 | 6.08 |
| Half Angle of View | 36.64 | 16.86 | 1.53 |
| Image Height | 3.29 | 3.88 | 3.88 |
| entire lens length | 86.73 | 85.72 | 125.37 |
| BF | 9.29 | 11.56 | 6.48 |
| d 5 | 0.65 | 14.08 | 55.37 |
| d11 | 29.76 | 6.03 | 1.05 |
| d12 | 11.21 | 10.44 | 0.35 |
| d19 | 4.94 | 12.11 | 21.10 |
| d21 | 2.56 | 3.18 | 12.70 |
| d25 | 7.63 | 9.90 | 4.82 |

Zoom Lens Unit Data

| Unit | First Surface | Focal Distance |
|---|---|---|
| 1 | 1 | 75.95 |
| 2 | 6 | −9.80 |
| 3 | 15 | 18.00 |
| 4 | 20 | −32.58 |
| 5 | 22 | 22.00 |

Numerical Example 3
Unit mm

Surface Data

| Surface Number | r | d | nd | vd |
|---|---|---|---|---|
| 1 | 98.491 | 1.20 | 1.83400 | 37.2 |
| 2 | 43.434 | 4.70 | 1.49700 | 81.5 |
| 3 | −159.616 | 0.05 | | |
| 4 | 36.222 | 3.05 | 1.48749 | 70.2 |
| 5 | 111.336 | (variable) | | |
| 6 | 514.419 | 0.60 | 1.83481 | 42.7 |
| 7 | 8.133 | 4.40 | | |
| 8 | −23.660 | 0.50 | 1.83481 | 42.7 |
| 9 | 34.646 | 0.05 | | |
| 10 | 18.453 | 1.95 | 1.92286 | 18.9 |
| 11 | −315.599 | (variable) | | |
| 12(Aperture) | ∞ | (variable) | | |
| 13* | 9.563 | 2.75 | 1.55332 | 71.7 |
| 14* | 115.399 | 1.10 | | |

Numerical Example 3
Unit mm

| | | | | |
|---|---|---|---|---|
| 15 | 36.917 | 1.50 | 1.43875 | 94.9 |
| 16 | −25.291 | 0.20 | | |
| 17 | 21.942 | 0.40 | 1.80610 | 33.3 |
| 18 | 8.574 | 0.80 | | |
| 19* | 16.404 | 2.80 | 1.49710 | 81.6 |
| 20* | −42.196 | 0.00 | | |
| 21 | ∞ | (variable) | | |
| 22 | −29.866 | 0.40 | 1.60311 | 60.6 |
| 23 | 35.519 | (variable) | | |
| 24 | 19.192 | 2.70 | 1.63854 | 55.4 |
| 25 | −27.370 | 0.50 | 1.95906 | 17.5 |
| 26 | −37.948 | (variable) | | |
| 27 | ∞ | 1.00 | 1.51633 | 64.1 |
| 28 | ∞ | 1.00 | | |
| Image Plane | ∞ | | | |

Non Spherical Data

Thirteenth Surface

K = −2.78153e−001 A 4 = −1.46256e−004 A 6 = −4.80002e−006
A 8 = −2.42095e−009

Fourteenth Surface

K = 0.00000e+000 A 4 = −4.98028e−005 A 6 = −3.92710e−006

Nineteenth surface

K = 0.00000e+000 A 4 = −2.63441e−005 A 6 = 7.07622e−006

Twentieth Surface

K = 0.00000e+000 A 4 = 4.98964e−005 A 6 = 6.81927e−006

Various Data
Zoom Ratio 38.66

| | | | |
|---|---|---|---|
| Focal Distance | 4.43 | 11.95 | 171.24 |
| F NUMBER | 3.50 | 4.20 | 6.08 |
| Half Angle of View | 36.64 | 17.96 | 1.30 |
| Image Height | 3.29 | 3.88 | 3.88 |
| entire lens length | 83.17 | 80.69 | 118.83 |
| BF | 6.87 | 14.34 | 3.69 |
| d 5 | 0.65 | 14.16 | 59.47 |
| d11 | 29.76 | 6.96 | 1.05 |
| d12 | 8.40 | 7.55 | 0.35 |
| d21 | 4.94 | 5.18 | 7.99 |
| d23 | 2.90 | 2.87 | 16.63 |
| d26 | 5.21 | 12.68 | 2.03 |

Zoom Lens Unit Data

| Unit | First Surface | Focal Distance |
|---|---|---|
| 1 | 1 | 76.91 |
| 2 | 6 | −9.24 |
| 3 | 13 | 15.58 |
| 4 | 22 | −26.84 |
| 5 | 24 | 21.76 |

Numerical Example 4
Unit mm
Surface Data

| Surface Number | r | d | nd | vd |
|---|---|---|---|---|
| 1 | 89.926 | 1.50 | 1.91082 | 35.3 |
| 2 | 51.205 | 5.36 | 1.49700 | 81.5 |
| 3 | −433.668 | 0.05 | | |
| 4 | 47.318 | 4.00 | 1.49700 | 81.5 |
| 5 | 222.579 | (variable) | | |
| 6 | 154.918 | 0.70 | 1.83481 | 42.7 |
| 7 | 8.049 | 4.10 | | |
| 8 | −68.966 | 0.55 | 1.80400 | 46.6 |
| 9 | 68.966 | 1.38 | | |
| 10 | −27.779 | 0.55 | 1.83481 | 42.7 |
| 11 | 94.099 | 0.05 | | |
| 12 | 24.075 | 1.71 | 1.95906 | 17.5 |
| 13 | −209.155 | (variable) | | |
| 14(Aperture) | ∞ | (variable) | | |
| 15* | 10.379 | 2.46 | 1.55332 | 71.7 |
| 16* | −82.275 | 2.29 | | |
| 17 | 21.254 | 0.50 | 1.77250 | 49.6 |
| 18 | 9.932 | 0.28 | | |
| 19 | 13.292 | 0.50 | 1.80518 | 25.4 |
| 20 | 8.473 | 2.90 | 1.49700 | 81.5 |
| 21 | −20.584 | 0.70 | | |
| 22 | ∞ | (variable) | | |
| 23 | −88.202 | 0.40 | 1.77250 | 49.6 |
| 24 | 8.312 | 1.40 | 1.68893 | 31.1 |
| 25 | 27.151 | (variable) | | |
| 26 | 21.594 | 2.84 | 1.65844 | 50.9 |
| 27 | −20.234 | 0.50 | 1.95906 | 17.5 |
| 28 | −36.497 | (variable) | | |
| 29 | ∞ | 1.00 | 1.51633 | 64.1 |
| 30 | ∞ | 1.00 | | |
| Image Plane | ∞ | | | |

Non Spherical Data

Fifteenth Surface

K = 8.82448e−001 A 4 = −1.80175e−004 A 6 = −4.70203e−006
A 8 = −5.13570e−008

Sixteenth Surface

K = 0.00000e+000 A 4 = 4.83284e−005 A 6 = −4.27636e−006

Various Data
Zoom Ratio 61.29

| | | | |
|---|---|---|---|
| Focal Distance | 3.87 | 117.22 | 237.15 |
| F NUMBER | 3.50 | 5.70 | 6.69 |
| Half Angle of View | 39.39 | 1.89 | 0.94 |
| Image Height | 3.18 | 3.88 | 3.88 |
| entire lens length | 97.23 | 145.12 | 148.22 |
| BF | 9.76 | 21.16 | 9.35 |
| d 5 | 0.75 | 63.36 | 67.76 |
| d13 | 33.68 | 0.66 | 0.62 |
| d14 | 12.33 | 2.63 | 0.46 |
| d22 | 1.98 | 10.85 | 11.98 |
| d25 | 4.02 | 11.74 | 23.33 |
| d28 | 8.10 | 19.50 | 7.69 |

Zoom Lens Unit Data

| Unit | First Surface | Focal Distance |
|---|---|---|
| 1 | 1 | 87.25 |
| 2 | 6 | −8.37 |
| 3 | 15 | 15.82 |
| 4 | 23 | −22.40 |
| 5 | 26 | 24.27 |

Numerical Example 5
Unit mm
Surface Data

| Surface Number | r | d | nd | vd |
|---|---|---|---|---|
| 1 | 37.451 | 0.90 | 1.84666 | 23.9 |
| 2 | 25.778 | 3.80 | 1.49700 | 81.5 |
| 3 | −1013.903 | 0.05 | | |
| 4 | 27.958 | 2.20 | 1.60311 | 60.6 |
| 5 | 82.604 | (variable) | | |
| 6 | 88.536 | 0.45 | 1.83481 | 42.7 |

Numerical Example 5
Unit mm

| | | | | |
|---|---|---|---|---|
| 7 | 5.709 | 3.80 | | |
| 8 | −19.785 | 0.35 | 1.83481 | 42.7 |
| 9 | 19.785 | 0.05 | | |
| 10 | 12.271 | 1.70 | 1.95906 | 17.5 |
| 11 | 100.103 | (variable) | | |
| 12 | ∞ | −0.50 | | |
| 13* | 7.216 | 2.10 | 1.49710 | 81.6 |
| 14* | −38.908 | 1.34 | | |
| 15(Aperture) | ∞ | 0.76 | | |
| 16 | 7.942 | 0.40 | 1.84666 | 23.9 |
| 17 | 5.056 | 0.42 | | |
| 18* | 8.016 | 2.20 | 1.49710 | 81.6 |
| 19* | −62.823 | 0.00 | | |
| 20 | ∞ | (variable) | | |
| 21 | −27.161 | 0.40 | 1.77250 | 49.6 |
| 22 | 6.182 | 1.35 | 1.69895 | 30.1 |
| 23 | 30.566 | (variable) | | |
| 24 | 18.968 | 2.90 | 1.83481 | 42.7 |
| 25 | −13.831 | 0.40 | 1.92286 | 18.9 |
| 26 | −45.451 | (variable) | | |
| 27 | −12.725 | 1.00 | 1.51633 | 64.1 |
| 28 | −11.480 | 0.46 | | |
| 29 | ∞ | 1.00 | 1.51633 | 64.1 |
| 30 | ∞ | 1.00 | | |
| Image Plane | ∞ | | | |

Non Spherical Data

Thirteenth Surface $K = -3.23201e-001 \; A\,4 = 5.01652e-005 \; A\,6 = -7.97668e-006$
$A\,8 = -7.26346e-007$

Fourteenth Surface $K = 3.80739e+001 \; A\,4 = 7.07513e-004 \; A\,6 = -3.71831e-005$

Eighteenth Surface $K = -1.61230e-002 \; A\,4 = 1.37402e-003 \; A\,6 = -5.25649e-005$
$A\,8 = -3.59959e-007$

Nineteenth Surface $K = 0.00000e+000 \; A\,4 = 8.61308e-004 \; A\,6 = -4.12336e-005$
$A\,8 = -1.17425e-006$

Various Data
Zoom Ratio 32.15

| | | | |
|---|---|---|---|
| Focal Distance | 4.35 | 15.96 | 140.00 |
| F NUMBER | 3.18 | 4.60 | 7.10 |
| Half Angle of View | 37.43 | 13.65 | 1.59 |
| Image Height | 3.33 | 3.88 | 3.88 |
| entire lens length | 62.63 | 67.62 | 85.92 |
| BF | 2.12 | 2.12 | 2.12 |
| d 5 | 0.41 | 11.86 | 28.65 |
| d11 | 24.90 | 8.97 | 0.90 |
| d20 | 1.75 | 2.03 | 6.00 |
| d23 | 2.35 | 2.50 | 19.86 |
| d26 | 5.03 | 14.06 | 2.31 |

Zoom Lens Unit Data

| Unit | First Surface | Focal Distance |
|---|---|---|
| 1 | 1 | 42.11 |
| 2 | 6 | −6.26 |
| 3 | 13 | 11.33 |
| 4 | 21 | −15.59 |
| 5 | 24 | 17.60 |
| 6 | 27 | 178.38 |

TABLE

| | EXAMPLE 1 | EXAMPLE 2 | EXAMPLE 3 | EXAMPLE 4 | EXAMPLE 5 |
|---|---|---|---|---|---|
| θ gF3P1 | 0.5402 | 0.5377 | 0.5402 | 0.5402 | 0.5377 |
| EXPRESSION VALUE OF CONDITIONAL EXPRESSION (1) | 0.0020 | 0.0055 | 0.0020 | 0.0020 | 0.0055 |
| ν d3P1 | 71.7 | 81.5 | 71.7 | 71.7 | 81.5 |
| θ gF3P2 | 0.5386 | 0.5377 | 0.5346 | 0.5386 | 0.5377 |
| EXPRESSION VALUE OF CONDITIONAL EXPRESSION (1) | 0.0065 | 0.0055 | 0.0072 | 0.0065 | 0.0055 |
| ν d3P2 | 81.6 | 81.5 | 94.9 | 81.6 | 81.5 |
| θ gF3P3 | — | — | 0.5377 | — | — |
| EXPRESSION VALUE OF CONDITIONAL EXPRESSION (1) | — | — | 0.0055 | — | — |
| ν d3P3 | — | — | 81.5 | — | — |
| f3/ft | 0.098 | 0.124 | 0.091 | 0.067 | 0.081 |
| |f4/f3| | 2.13 | 1.81 | 1.72 | 1.42 | 1.38 |
| M3/fw | 4.83 | 5.30 | 3.07 | 7.47 | 4.37 |
| |f4/ft| | 0.21 | 0.23 | 0.16 | 0.094 | 0.11 |
| |f2/ft| | 0.050 | 0.068 | 0.054 | 0.035 | 0.045 |
| f3/fw | 3.89 | 4.06 | 3.52 | 4.09 | 2.60 |
| M1/M3 | 1.76 | 1.65 | 2.62 | 1.76 | 1.22 |
| ν d3Pave | 76.6 | 81.6 | 82.7 | 76.6 | 81.6 |

Referring now to FIG. 11, an example of a digital still camera using the zoom lens of this disclosure as an image pickup optical system will be described. In FIG. 11, reference numeral 20 denotes a camera body, reference numeral 21 denotes an image pickup optical system composed of any one of zoom lenses described in Examples 1 to 5. Reference numeral 22 denotes a solid image pickup element (photo-electric conversion element) such as a CCD sensor or a CMOS sensor configured to receive an image of an object formed by an image pickup optical system 21. Reference numeral 23 denotes a memory configured to record information on an image corresponding to the image of the object having subjected to the photo-electric conversion by a solid image pickup element 22. Reference numeral 24 denotes a finder formed of a liquid-crystal display panel or the like and configured to be used for observing the image of the object formed on the solid image pickup element 22. In this manner, by applying the zoom lens of this disclosure to the image pickup apparatus such as the digital still camera, the image pickup apparatus having a high magnification, a wide viewing angle, a compact profile, and a desirably corrected chromatic aberration is obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-240991, filed Nov. 21, 2013, which is hereby incorporated by reference herein in its entirety.

What is claimed is:

1. A zoom lens comprising:
    a first lens unit having a positive refractive power, a second lens unit having a negative refractive power, a third lens unit having a positive refractive power, a fourth lens unit having a negative refractive power, and a fifth lens unit having a positive refractive power in this order from an object side to an image side,
    wherein, during zooming, the lens units move along predetermined loci such that an interval between adjacent lens units varies, and the first lens unit and the third lens unit move toward the object side at a telephoto end in comparison with a wide angle end,
    wherein the third lens unit includes at least two positive lenses formed of a material which satisfies the following conditional expressions, $$\theta gF3P - (-1.665 \times 10^{-7} \cdot vd3P^3 + 5.213 \times 10^{-5} \cdot vd3P^2 - 5.656 \times 10^{-3} \cdot vd3P + 0.737) > 0$$

$$50.0 < vd3P < 100.0$$

where $\theta gF3P$ is a partial dispersion ratio of the material and $vd3P$ is the Abbe number of the positive lens included in the third lens unit, and
    wherein the zoom lens satisfies the following conditional expressions $$0.01 < f3/ft < 0.15$$

$$0.5 < |f4/f3| < 2.5$$

$$3.00 < M3/fw < 30.00$$

where fw is a focal length of the zoom lens at the wide angle end, ft is a focal length of the zoom lens at the telephoto end, f3 is a focal length of the third lens unit, f4 is a focal length of the fourth lens unit, and M3 is an amount of movement of the third lens unit at the time of zooming from the wide angle end to the telephoto end.

2. The zoom lens according to claim 1, wherein the conditional expression $$0.01 < |f4/ft| < 0.25$$

is satisfied.

3. The zoom lens according to claim 1, wherein the conditional expression $$0.01 < |f2/ft| < 0.10$$

where f2 is a focal distance of the second lens unit is satisfied.

4. The zoom lens according to claim 1, wherein the conditional expression $$2.0 < f3/fw < 8.0$$

is satisfied.

5. The zoom lens according to claim 1, wherein the conditional expression $$0.8 < M1/M3 < 5.0$$

where M1 is an amount of movement of the first lens unit at the time of zooming from the wide angle end to the telephoto end, is satisfied.

6. The zoom lens according to claim 1, wherein the conditional expression $$71.0 < vd3Pave < 100.0$$

where vd3Pave is an average value of the Abbe number of all positive lenses included in the third lens unit, is satisfied.

7. The zoom lens according to claim 1, comprising a sixth lens unit having a positive refractive power on the image side of the fifth lens unit.

8. The zoom lens according to claim 1, wherein focusing from an object at infinity to an object at short-distance is achieved by moving the fifth lens unit parallel to the optical axis in a direction towards the object side.

9. The zoom lens according to claim 1, comprising an aperture stop configured to move along a locus different from the loci of movement of the lens units at the time of zooming.

10. An image pickup apparatus comprising:
    a zoom lens; and
    an image sensor configured to receive an image formed by the zoom lens, wherein
    the zoom lens comprises, in order from an object side to an image side,
    a first lens unit having a positive refractive power, a second lens unit having a negative refractive power, a third lens unit having a positive refractive power, a fourth lens unit having a negative refractive power, and a fifth lens unit having a positive refractive power in this order,
    wherein, during zooming, the lens units move to draw predetermined loci such that an interval between lens units varies, and the first lens unit and the third lens unit move toward the object side at the telephoto end in comparison with a wide angle end,
    wherein the third lens unit includes at least two positive lenses formed of a material which satisfies the following conditional expressions, $$\theta gF3P - (-1.665 \times 10^{-7} \cdot vd3P^3 + 5.213 \times 10^{-5} \cdot vd3P^2 - 5.656 \times 10^{-3} \cdot vd3P + 0.737) > 0$$

$$50.0 < vd3P < 100.0$$

where θgF3P is a partial dispersion ratio of a material and vd3P is the Abbe number of the positive lens included in the third lens unit, and wherein the zoom lens satisfies the following conditional expressions $$0.01 < f3/ft < 0.15$$

$$0.5 < |f4/f3| < 2.5$$

$$3.00 < M3/fw < 30.00$$

where fw is a focal length of the zoom lens at the wide angle end, ft is a focal length of the zoom lens at the telephoto end, f3 is a focal length of the third lens unit, f4 is a focal length of the fourth lens unit, and M3 is an amount of movement of the third lens unit at the time of zooming from the wide angle end to the telephoto end.

* * * * *